US009461812B2

(12) United States Patent
Poulsen

(10) Patent No.: US 9,461,812 B2
(45) Date of Patent: Oct. 4, 2016

(54) INCREASED BANDWIDTH ENCODING SCHEME

(71) Applicant: BLACKBERRY LIMITED, Waterloo (CA)

(72) Inventor: Jens Kristian Poulsen, Kitchener (CA)

(73) Assignee: Blackberry Limited, Waterloo, Ontario (CA)

( * ) Notice: Subject to any disclaimer, the term of this patent is extended or adjusted under 35 U.S.C. 154(b) by 471 days.

(21) Appl. No.: 14/021,371

(22) Filed: Sep. 9, 2013

(65) Prior Publication Data

US 2014/0247834 A1    Sep. 4, 2014

Related U.S. Application Data

(63) Continuation-in-part of application No. 13/784,457, filed on Mar. 4, 2013.

(51) Int. Cl.
*H04L 7/00* (2006.01)
*H04L 12/403* (2006.01)
*H04L 25/49* (2006.01)

(52) U.S. Cl.
CPC .......... *H04L 7/0066* (2013.01); *H04L 12/4035* (2013.01); *H04L 25/4915* (2013.01); *G06F 2221/2101* (2013.01)

(58) Field of Classification Search
CPC .............. H04L 7/0066; H04L 12/4035; H04L 25/4915; H04L 1/20; H04L 25/0262; H04L 1/246; G06F 2221/2101
See application file for complete search history.

(56) References Cited

U.S. PATENT DOCUMENTS

| 3,710,262 A | 1/1973 | Sorensen |
| 3,810,111 A | 5/1974 | Patel |
| 3,883,729 A | 5/1975 | de Cremiers |
| 3,995,264 A | 11/1976 | Ouchi |
| 4,218,770 A * | 8/1980 | Weller ................ H04L 1/0083 375/360 |
| 4,321,483 A | 3/1982 | Dugan |
| 4,530,088 A | 7/1985 | Hamstra et al. |

(Continued)

FOREIGN PATENT DOCUMENTS

| CA | 2759946 A1 | 6/2012 |
| CN | 101336561 B | 7/2012 |

(Continued)

OTHER PUBLICATIONS

Document relating to U.S. Appl. No. 13/020,850, dated Sep. 2, 2014 (Response with Terminal Disclaimer).

(Continued)

*Primary Examiner* — Yee Lam
(74) *Attorney, Agent, or Firm* — Perry + Currier, Inc.

(57) ABSTRACT

Embodiments of various methods, devices and systems are described herein that correspond to an encoding scheme that can be used with various communication protocols for increased bandwidth over a single wire bus or a wireless single transmission channel. For example, a method of encoding a series of data bits to increase bandwidth may comprise selecting a data bit in the series of data bits, generating an inverted version of the selected data bit, positioning the inverted version of the selected data bit in a consecutive fashion with respect to the selected data bit to signify an edge of a clock signal, and transmitting the inverted version of the selected data bit and the series of data bits with each bit being transmitted in a single unique time slot.

20 Claims, 12 Drawing Sheets

(56) References Cited

U.S. PATENT DOCUMENTS

| | | | |
|---|---|---|---|
| 4,584,719 A * | 4/1986 | Miller | H04B 10/29 327/18 |
| 4,592,077 A | 5/1986 | Norton | |
| 4,807,260 A * | 2/1989 | Solina | H03M 5/12 375/333 |
| 4,817,117 A | 3/1989 | Tasto et al. | |
| 4,860,286 A * | 8/1989 | Forsberg | H04J 3/0605 370/510 |
| 4,907,222 A | 3/1990 | Slavik | |
| 5,012,240 A | 4/1991 | Takahashi et al. | |
| 5,060,227 A | 10/1991 | Finley et al. | |
| 5,210,846 A | 5/1993 | Lee | |
| 5,237,322 A | 8/1993 | Heberle | |
| 5,297,181 A | 3/1994 | Barr et al. | |
| 5,398,326 A | 3/1995 | Lee | |
| 5,459,722 A | 10/1995 | Sherif | |
| 5,495,240 A | 2/1996 | Heberle | |
| 5,532,556 A | 7/1996 | Anderson et al. | |
| 5,577,044 A | 11/1996 | Oxford | |
| 5,856,975 A | 1/1999 | Rostoker et al. | |
| 5,862,354 A | 1/1999 | Curiger et al. | |
| 5,864,872 A | 1/1999 | Lee et al. | |
| 5,903,607 A | 5/1999 | Tailliet | |
| 6,009,389 A | 12/1999 | Dokic et al. | |
| 6,026,088 A | 2/2000 | Rostoker et al. | |
| 6,108,751 A | 8/2000 | Lee et al. | |
| 6,145,007 A | 11/2000 | Dokic et al. | |
| 6,182,180 B1 | 1/2001 | Liu et al. | |
| 6,205,504 B1 | 3/2001 | Faust et al. | |
| 6,438,434 B1 | 8/2002 | Kamiya | |
| 6,507,299 B1 | 1/2003 | Nuijten | |
| 6,532,506 B1 | 3/2003 | Dunstan et al. | |
| 6,535,505 B1 | 3/2003 | Hwang et al. | |
| 6,539,443 B1 | 3/2003 | Dunstan et al. | |
| 6,567,780 B2 | 5/2003 | Rhoads | |
| 6,697,897 B1 | 2/2004 | Friel et al. | |
| 6,737,957 B1 | 5/2004 | Petrovic et al. | |
| 6,904,110 B2 | 6/2005 | Trans et al. | |
| 6,931,370 B1 | 8/2005 | McDowell | |
| 6,944,298 B1 | 9/2005 | Rhoads | |
| 6,947,893 B1 | 9/2005 | Iwaki et al. | |
| 7,054,280 B2 | 5/2006 | Novak et al. | |
| 7,099,970 B1 | 8/2006 | Foegelle et al. | |
| 7,181,557 B1 | 2/2007 | Falik et al. | |
| 7,200,782 B2 | 4/2007 | Vining | |
| 7,245,630 B1 | 7/2007 | Chen et al. | |
| 7,292,876 B2 | 11/2007 | Bosch et al. | |
| 7,324,159 B2 | 1/2008 | Eveleens et al. | |
| 7,365,669 B1 | 4/2008 | Melanson | |
| 7,406,100 B2 | 7/2008 | Rocas et al. | |
| 7,519,005 B2 | 4/2009 | Hejdeman et al. | |
| 7,590,070 B1 | 9/2009 | Asawa et al. | |
| 7,606,955 B1 | 10/2009 | Falik et al. | |
| 7,668,202 B2 | 2/2010 | Gillet | |
| 8,103,869 B2 | 1/2012 | Balandin et al. | |
| 8,161,224 B2 | 4/2012 | Laurencin et al. | |
| 8,775,707 B2 | 7/2014 | Poulsen | |
| 2004/0068535 A1 | 4/2004 | Subbiah et al. | |
| 2004/0116151 A1 | 6/2004 | Bosch et al. | |
| 2004/0233917 A1 | 11/2004 | Rocas et al. | |
| 2005/0049020 A1 | 3/2005 | Higgins et al. | |
| 2005/0259609 A1 | 11/2005 | Hansquine et al. | |
| 2006/0187969 A1 | 8/2006 | Kadowaki | |
| 2007/0121006 A1 | 5/2007 | Kim | |
| 2007/0162665 A1 | 7/2007 | Lee | |
| 2007/0232266 A1 | 10/2007 | Pinder et al. | |
| 2008/0163663 A1 | 7/2008 | Hankey et al. | |
| 2008/0181186 A1 | 7/2008 | Rofougaran | |
| 2008/0279320 A1 | 11/2008 | Rocas et al. | |
| 2009/0024235 A1 | 1/2009 | Kim | |
| 2009/0116475 A1 | 5/2009 | Krzyzanowski et al. | |
| 2009/0119439 A1 | 5/2009 | Zou et al. | |
| 2009/0302806 A1 | 12/2009 | Lindlar et al. | |
| 2009/0323975 A1 | 12/2009 | Groesch | |
| 2010/0022183 A1 | 1/2010 | Ryle et al. | |
| 2010/0260362 A1 | 10/2010 | Sander et al. | |
| 2010/0309791 A1 * | 12/2010 | Fuller | H04L 1/20 370/242 |
| 2010/0315964 A1 | 12/2010 | Kim et al. | |
| 2012/0014530 A1 | 1/2012 | Yamkovoy | |
| 2012/0144078 A1 | 6/2012 | Poulsen | |
| 2012/0203560 A1 | 8/2012 | Poulsen | |
| 2013/0108068 A1 | 5/2013 | Poulsen | |
| 2013/0174208 A1 | 7/2013 | Lee et al. | |
| 2013/0322461 A1 | 12/2013 | Poulsen | |
| 2013/0322462 A1 | 12/2013 | Poulsen | |
| 2014/0247834 A1 | 9/2014 | Poulsen | |

FOREIGN PATENT DOCUMENTS

| | | |
|---|---|---|
| CN | 102591834 A | 7/2012 |
| EP | 0405968 B1 | 9/1995 |
| EP | 0693729 B1 | 2/2000 |
| EP | 2466481 A1 | 6/2012 |
| EP | 2775654 A1 | 9/2014 |
| JP | 58095447 | 6/1983 |
| JP | 58101541 | 6/1983 |
| WO | 2004086614 A1 | 10/2004 |
| WO | 2007068500 A1 | 6/2007 |
| WO | 2009045904 | 4/2009 |
| WO | 2010010278 | 1/2010 |
| WO | 2012012309 | 1/2012 |
| WO | 2013177664 A1 | 12/2013 |
| WO | 2013177665 A1 | 12/2013 |

OTHER PUBLICATIONS

Document relating to U.S. Appl. No. 13/020,850, dated Sep. 15, 2014 (Notice of Allowance).

Atmel Corporation. AVR318: Dallas 1-Wire master. Application Note. 2004.

Springbok Digitronics. 1-Wire FAQ. Design Guide v1.0. Aug. 19, 2004.

Awtrey, Dan. Dallas Semiconductor. Sensors: The Journal of Applied Sensing Technology: Transmitting Data and Power over a One-Wire Bus. Feb. 1997.

Document relating to U.S. Appl. No. 13/020,850 dated Dec. 17, 2013 (Office Action).

Prosecution Documents for U.S. Appl. No. 12/958,942, application allowed Feb. 26, 2014.

Document relating to U.S. Appl. No. 13/282,577, dated Feb. 20, 2014 (Office Action).

Document relating to U.S. Appl. No. 13/020,850, dated Mar. 17, 2014 (Informal or Non-responsive amendment).

Document relating to U.S. Appl. No. 13/020,850 dated Mar. 21, 2014 (Notice re non-compliant or non-responsive amendment).

Future Technology Devices International Ltd. FT201X (USB I2C Slave IC) Datasheet Version 1.3, 2013.

SMSC USB3503, USB 2.0 HSIC High-Speed Hub Controller Optimized for Portable Applications Datasheet Revision 1.1 (Feb. 7, 2013).

Texas Instruments USB Interface Adapter Evaluation Module User's Guide, Literature No. SLLU093, Aug. 2006.

Cypress Semiconductor Corporation USB Hi-Speed Hubs webpages printed from www.cypress.com/?id-183&source=header, printed Apr. 2, 2014.

Robot Electronics—Using the I2C Bus, I2C Tutorial webpages printed from www.robot-electronics.co.uk/acatalog/I2C_Tutorial.html, printed Nov. 28, 2013.

Linear Technology Corporation Datasheet—LTC4099, I2C Controlled USB Power Manager/Charger with Overvoltage protection, pp. 21-22, 2008.

Wikipedia—I2C, webpages prinited from http://en.wikipedia.org/wiki/I2C, printed Nov. 28, 2013.

Philips Semiconductors, The I2C-Bus Specification, Version 2.1, Jan. 2000.

Document relating to EP Application No. 14156604.2, dated Mar. 18, 2014 (Registered Letter re formalities/EPO Form 2901).

Final Office Action. U.S. Appl. No. No. 13/282,577. Dated: Sep. 25, 2014.

(56) References Cited

OTHER PUBLICATIONS

Petition to Withdraw an Application from Issue after Payment of the Issue Fee under 37 CFR 1.313(c). U.S. Appl. No. 13/020,850. Dated: Jan. 21, 2015.
Decision on Petition. U.S. Appl. No. 13/020,850. Dated: Jan. 21, 2015.
Request for Continued Examination (RCE). U.S. Appl. No. 13/020,850. Dated: Jan. 21, 2015.
Patent Withdrawal Notice. U.S. Appl. No. 13/020,850. Dated: Jan. 22, 2015.
Notice of Allowance. U.S. Appl. No. 13/020,850. Dated: Feb. 3, 2015.
Benjamin W. Wah, Xiao Su and Dong Lin. A Survey of Error-Concealment Schemes for Real-Time Audio and Video Transmissions over the Internet. Department of Electrical and Computer Engineering and the Coordinated Science Laboratory University of Illinois at Urbana-Champaign, Urbana, IL 61801, USA Dec. 2000.
Wen-Tsai Liao, Jeng-Chun Chen and Ming-Syan Chen. Adaptive Recovery Techniques for Real-Time Audio Streams. Electrical Engineering Department National Taiwan University, Taipei, Taiwan, ROC. Apr. 2001.
Prima LT Users Guide—Feature Overview and Model Description. Online at <http://www.musicamusa.com/techdocs/Manual/lt/ltuser1.PDF> Available as early as Apr. 2001.
Document relating to EP Application No. 14156604.2, dated Apr. 23, 2014 (Extended European Search Report).
Ito T. et al.: "mB1C Code and Its Performance in an Optical Communication System", IEEE Transactions on Communications, IEEE Service Center, Piscataway, NJ, USA, vol. COM-32, No. 2, Feb. 1, 1984, pp. 163-168, XP000758558, ISSN: 0090-6778.
Fairhurst G.: "Manchester Encoding", Internet Citation, Sep. 2001, XP002348542, Retrieved from the Internet: URL: http://www.erg.abdn.ac.uk/users/gorry/course/phy-pages/man.html [retrieved on Oct. 11, 2005].
Maxim Integrated Products, Overview of 1-Wire Technology and Its Use, http://pdfserv.maxim-ic.com/en/an/AN1796.pdf, Jun. 19, 2008.
Downs, "Using 1-Wire I/O for Distributed System Monitoring", The AIAA/IEEE/Digital Avionics Systems Conference Proceedings, Sep. 15, 1998, pp. 161-168, XP010305393.
Document relating to U.S. Appl. No. 13/803,393, dated Jun. 6, 2013 (Preliminary Amendment).
Document relating to U.S. Appl. No. 13/784,457 dated Mar. 8, 2013 (Preliminary Amendment).
Document relating to U.S. Appl. No. 13/784,457 dated Mar. 18, 2013 (Preliminary Amendment).
Document relating to U.S. Appl. No. 13/784,457 dated Nov. 8, 2013 (Preliminary Amendment).
Document relating to U.S. Appl. No. 12/958,942, dated Jan. 24, 2013 (Office Action).
Document relating to U.S. Appl. No. 12/958,942, dated Apr. 24, 2013 (Office Action Response).
Document relating to U.S. Appl. No. 12/958,942, dated May 30, 2013 (Office Action).
Document relating to U.S. Appl. No. 12/958,942, dated Jul. 29, 2013 (Office Action Response).
Document relating to U.S. Appl. No. 12/958,942, dated Aug. 5, 2013 (Advisory Action).
Document relating to U.S. Appl. No. 12/958,942, dated Aug. 23, 2013 (Request for Continued Examination).
Document relating to U.S. Appl. No. 12/958,942, dated Nov. 4, 2013 (Office Action).
Hi-Mobile.Net, i.Tech Clip D-Radio Bluetooth Stereo Headset with Display Product Information, downloaded from http://www.hi-mobile.net/i-tech-bluetooths-clip-d-radio on Apr. 2010.
Nokia Stuff, Nokia BH-216 Bluetooth Headset with Display Product Information, downloaded from http://www.nokiastuff.net/nokia-bh-216-bluetooth-headset-with-display on Apr. 2010.
The Society of Motion Picture and Television Engineers. Proposed SMPTE Standard for Television—Format for Non-PCM Audio and Data in an AES3 Serial Digital Audio Interface, SMPTE Journal, Apr. 2000.
International Telecommunication Union, Procedures for the simultaneous transmission of data and digitally encoded voice signals over the GSTN, or over a 2-wire leased point to point telephone type circuits, Aug. 1, 1996.
Walt Kester, MT-022 Tutorial: ADC Architectures III: Sigma-Delta ADC Basics, 2009.
NXP Semiconductors, TFA9881: PDM input mono class D audio amplifier, marked as confidential as of May 18, 2009.

* cited by examiner

BW=1/3, Power = 2 transitions/bit

BW=2/3, Power = 0.875 transitions/bit

BW=5/6, Power = 0.7

| L | R | VR | L | R | S0 |
|---|---|----|---|---|-----|
| L | R | IL | L | R | X15 |
| L | R | IR | L | R | X14 |
| L | R | VR | L | R | X12 |
| L | R | IL | L | R | X11 |
| L | R | IR | L | R | X10 |
| L | R | VL | L | R | X9 |
| L | R | VR | L | R | X8 |

FIG. 12b

INCREASED BANDWIDTH ENCODING SCHEME

CROSS-REFERENCE TO RELATED APPLICATIONS

This application is a continuation-in-part of U.S. patent application Ser. No. 13/784,457, filed Mar. 4, 2013. The entire contents of U.S. patent application Ser. No. 13/784,457 is hereby incorporated by reference.

FIELD

The various embodiments described herein generally relate to a method, system and communication protocol for implementing an increased bandwidth encoding scheme for bus systems or wireless communication.

BACKGROUND

In a computer or processor architecture, a bus is a subsystem that transfers data between devices within an electronic device or transfers data between electronic devices. Bus architectures are also used in common data signalling paths for multiple devices rather than having separate connections between each set of devices that may communicate with one another. In other words, the bus structure can be used to allow one or more slave devices to communicate with one or more master devices. Typically, the bus architectures use two wires or two communication channels to transmit data signals and clock signals, respectively.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described.

FIG. 9b is a block diagram of an example embodiment of an increased bandwidth signal and a resulting edge detect signal generated by the clock edge detector of FIG. 9a;

FIG. 12b shows an example of a frame format that can be used for a unified communication protocol with increased bandwidth encoding for the system of FIG. 12a.

DETAILED DESCRIPTION OF THE EMBODIMENTS

Figure 1:
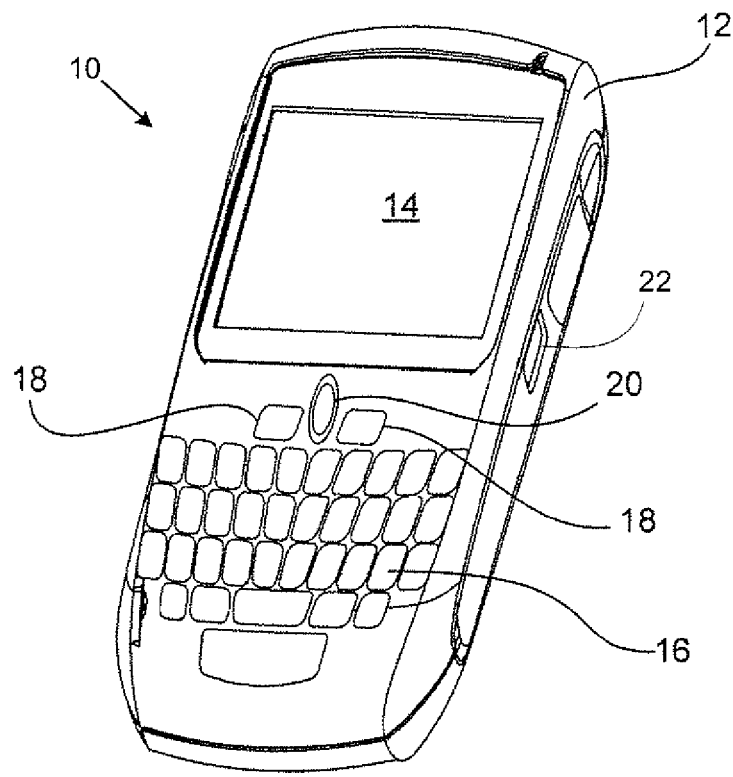
FIG. 1 is a perspective view of an example embodiment of a portable electronic device.

Various apparatuses or processes will be described below to provide an example of an embodiment of each claimed subject matter. No embodiment described below limits any claimed subject matter and any claimed subject matter may cover processes or apparatuses that differ from those described below. The claimed subject matter are not limited to apparatuses or processes having all of the features of any one apparatus or process described below or to features common to multiple or all of the apparatuses or processes described below. It is possible that an apparatus or process described below is not an embodiment that is recited in any claimed subject matter. Any subject matter disclosed in an apparatus or process described herein that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the example embodiments described herein in any way, but rather as merely describing the implementation of various embodiments as described.

In at least some cases, the example embodiments of the systems and methods described herein may be implemented as a combination of hardware or software. In some cases, the example embodiments described herein may be implemented, at least in part, by using one or more computer programs, executing on one or more programmable devices comprising at least one processor, a data storage system (including volatile and non-volatile memory and/or storage elements), at least one input device (e.g. a keyboard, mouse or touchscreen), and at least one output device (e.g. a display screen, a printer, a wireless radio and the like).

For example, and without limitation, the programmable devices may include servers, personal computers, laptops, tablets, personal data assistants (PDA), cell phones, smart phones, gaming devices, stereos, DVD players, Blu-ray players and other mobile devices. Program code can be applied to input data and/or output data to perform the functions generally described herein.

It should also be noted that at least some of the elements used to perform at least one of the methods described herein that are implemented via software may be written in a high-level procedural language such as object oriented programming. Accordingly, the program code may be written in C, C++ or any other suitable programming language and may comprise modules or classes, as is known to those skilled in object oriented programming. Alternatively, or in addition thereto, at least some of these elements implemented via software may be written in assembly language, machine language or firmware as needed. In other cases, some or all of the elements may be implemented using a language suited for silicon implementation such as Verilog or VHDL. In either case, the language may be a compiled or interpreted language.

The computer programs may be stored on a storage media (e.g. a computer readable medium such as, but not limited to, ROM, magnetic disk, optical disc) or a device that is readable by a general or special purpose programmable device. The program code, when read by the programmable device, configures the programmable device to operate in a new, specific and predefined manner in order to perform at least one of the methods described herein.

Furthermore, some of the programs associated with the systems and methods of the embodiments described herein are capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage. In alternative embodiments, the medium may be transitory in nature such as, but not limited to, wire-line transmissions, satellite transmissions, Internet transmissions (e.g. downloads), media, digital and analog signals, and the like. The computer useable instructions may also be in various formats, including compiled and non-compiled code.

It should also be noted that the term coupled as used herein can have several different meanings depending in the context in which the term is used. For example, the term coupling can have a mechanical, electrical, optical or communicative connotation. For example, in some contexts, the term coupling indicates that two elements or devices can be physically connected to one another or connected to one another through one or more intermediate elements or devices via a direct coupling, such as a wire or cable, for example. In some contexts, the term coupling indicates that two elements or devices can be connected through other means such as a wireless signal, optical signal, magnetic or electrical signal, for example. Furthermore, the term "communicative coupling" indicates that an element or device can electrically, optically, or wirelessly send data to another element or device as well as receive data from another element or device.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should also be noted that the terms "master" and as "slave" as used herein are meant purely from a technological point of view and in particular denotes the technical relationship between a host device or a first element and a peripheral device or second element in which the first element or master device provides instructions or control signals to the second element or slave device. Accordingly, the use of the terms "master" and "slave" as used herein is not meant to carry any connotation beyond the technical meaning given here.

It should also be noted that although an increased bandwidth encoding scheme is described herein with various example embodiments that show a data bus that couples various elements together, the increased bandwidth encoding scheme according to the teachings herein can also be implemented over a different interface such as a wireless or optical interface. Furthermore, the increased bandwidth encoding scheme can be integrated with a variety of different bus communication protocols.

The detailed description begins with a general description of a mobile device and then proceeds to describe example embodiments of an increased bandwidth encoding scheme that can be used so that devices can communicate with one another using a single wire or single channel based on combining clock information and data signals in a unique, more efficient manner while being able to support different types of data formats and communication protocols. The increased bandwidth encoding scheme according to the teachings herein may be used to provide a high bandwidth interface with low power consumption for devices that communicate with one another. In addition, or alternatively, the increased bandwidth encoding scheme according to the teachings herein may also be used to provide a high bandwidth unified interface for devices that generate numeric data in different formats but can be coupled to communicate with one another using one or more channels.

The increased bandwidth encoding scheme according to the teachings herein allow for communication between at least two devices, such as between a master device and a slave device, between two or more master devices, between two slave devices and between a master device and more than one slave device. The data communication between the devices generally utilizes a clock signal unless otherwise specified and the communication can be bi-directional unless otherwise specified. The clock signal is used to obtain timing information about when to sample or write during specific time slots. The clocking information is normally provided by the master but could also be provided by other devices.

The data that is communicated using the increased bandwidth encoding schemes, according to the teachings herein, may include synchronization data, control data, numeric data, and clock information. The numeric data can be audio data or measurement data such as current, voltage, pressure, temperature, and the like. The numeric data can be initially produced by a device in a bitstream (PDM, pulse density modulated) format or a digital word format (PCM, pulse-code modulation). Digital words are meant to cover binary-coded words such as twos complement or sign magnitude, and floating point words (i.e. unsigned or two's complement word), but could also be a compressed or encrypted version of digital data. Some power may also be transmitted over a physical bus using the increased bandwidth encoding scheme by charging internal circuits with energy delivered during the signaling of information, e.g. a high voltage level could be used to simultaneously signal a logic high and at the same time charge an internal circuit in a slave to provide power. This scheme will work as long as the power consumption requirements are moderate or small for the devices.

The various increased bandwidth encoding schemes according to the teachings herein allow for a reduction in the number of wires that may be used for a bus or a reduction in the number of communication channels when using wireless or optical communication. Accordingly, the increased bandwidth encoding scheme according to the teachings may generally be implemented on a single wire bus or using a single communication channel.

The various increased bandwidth encoding schemes according to the teachings herein permits the use of only two timeslots to be used by a master device to transmit clock information while all the following timeslots can be controlled independently by different transmitters thereby enabling quicker switching between multiple transmitters. This may allow lower latency between transmission from different transmitters and different channels. Furthermore, the encoding has a lower number of transitions per transmitted value as compared to earlier solutions and thereby lowers power consumption.

Depending on the particular communication protocol that may be used with the increased bandwidth encoding schemes taught herein, it may be possible to allow for continuous operation, unless otherwise stated, of a variable number of devices that are all synchronized by the same clock signal and charge or discharge the bus at specified time instants, depending on the bus communication protocol that is used. In embodiments where the system clock frequency is low, one or more bus holders can be added to maintain charge on the bus.

In bus architectures, there is often a mechanism for devices to signal when they need to use the bus, while it is in use, and the nature of the use, such as for numeric data and the transmission of command instructions, for example. However, bus control can become quite complicated when numerous asynchronous processes are attempting to share the bus efficiently as well as when those processes use different data formats such as bitstream (PDM) data and digital word data. For example, in conventional bus systems, different interfaces are needed to support various kinds of data. As an example, traditional PCM interfaces support digital word data but not bitstream data and bitstream interfaces do not support digital word data. There are often systems that use both types of data since in some applications sensors use Nyquist-type converters (e.g. temperature sensors, accelerometers, and displays) that use binary words and in some applications bitstream interfaces are used for low latency applications such as beamforming, active noise cancellation or low latency control applications using microphones and digital class-D amplifiers with PDM inputs, for example. Conventional bus systems use one interface to communicate digital word data (such as the McBSP interface which requires 4 bus wires), another interface to communicate bitstream data (such as at least one McPDM interface which requires another 4 bus wires) and another interface for control data (such as $I^2C$ which requires another 2 bus wires) for a total of at least three interfaces and at least 10 bus wires and terminals. This adds costs and extra space requirements for the components involved as well as increased power consumption. Furthermore, when such systems are used with external devices, multiple connectors are used resulting in larger space requirements.

Accordingly, in at least one embodiment described herein, one aspect of the increased bandwidth encoding scheme described herein is the provision of a unified interface that can handle bitstream data, digital word data and control data while using a smaller number of wires and therefore a smaller number of terminals. The advantages of bitstream processing, such as low latency and fast transient response, can be maintained by avoiding the use of the digital word format. Therefore, an aspect of at least one embodiment of the increased bandwidth encoding scheme described herein is that bitstream data can be multiplexed in order to achieve the same latency for bitstream processing (i.e. one bit latency). Furthermore, digital word data can be transmitted one bit a time with each bit being multiplexed with the bitstream data, which eliminates the use of a digital word data interface. In addition, control data, such as synchronization data and command data, can be converted to a bitstream format and embedded as part of the multiplexed data, which eliminates the use of an extra interface (e.g. $I^2C$) and also provides a robust programmable multiformat data interface.

Referring now to FIG. 1, shown therein is a perspective view of a portable electronic device 10. In this example, the portable electronic device 10 is a mobile communication device such as a cellular phone or a smart phone. However, it should be understood that the embodiments described herein are not limited to a phone but can be extended to any electronic device that can benefit from an increased bandwidth encoding scheme. Examples of such electronic devices generally include any portable electronic device such as cellular phones wireless organizers, personal digital assistants, computers, laptops, handheld wireless communication devices, wireless enabled notebook computers, tablet computers or e-readers, electronic security devices, wireless Internet appliances, radios, TV's, electronic games, setup boxes and the like. Other examples are provided throughout this description. The electronic devices listed herein which are mobile are generally portable and thus are battery-powered and may have limited processing power and/or limited space, in which case it is beneficial to use a more efficient communication protocol as described herein. Electronic devices may also include cable television boxes, music players, computing devices, non-portable electronics and the like.

The portable electronic device 10 has a body 12 which includes a display screen 14, a keyboard/keypad 16, a set of buttons 18 and a user input device 20, such as a trackpad or a trackball. It will be understood that the user input device 20 is representative of a user-operated pointing or input device, which could also be presented as a joystick, scroll wheel, roller wheel, mouse or touchpad or the like, or another button. The portable electronic device 10 includes other parts that are not shown or described because they are well known to those skilled in the art. The portable electronic device 10 also includes at least one port 22 for receiving an electrical connector or a jack.

It should be noted that in at least some embodiment, the display screen 14 can be a touch screen that operates as an input device as well as an output device. It will be appreciated that there may be embodiments where device 10 can be a touch screen only device, i.e. with no keyboard or input device 20 and the touchscreen performs the operations of the keyboard 16 and the input device 20.

Figure 2:
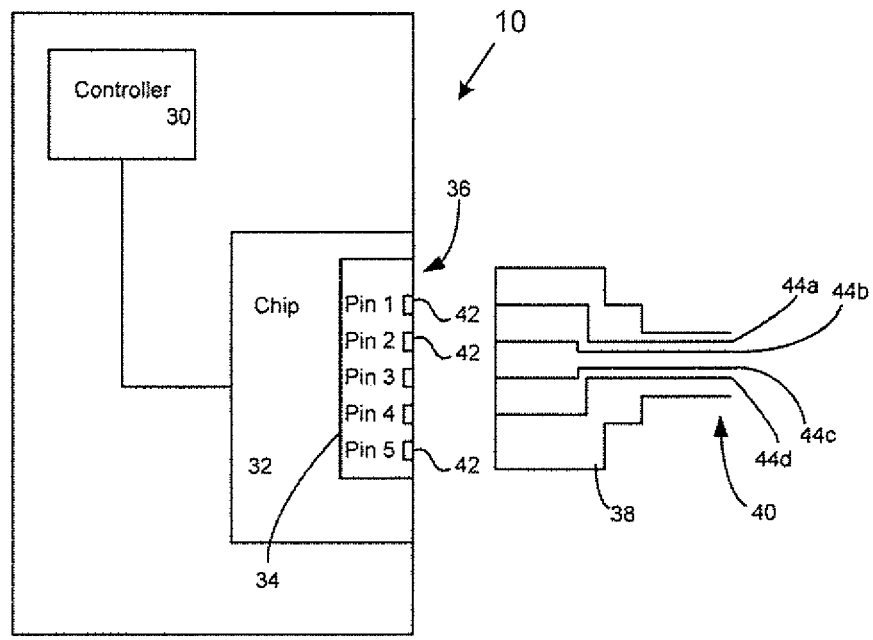
FIG. 2 is a block diagram of a portion of the portable electronic device.

Referring now to FIG. 2, shown therein is a block diagram of a portion of the portable electronic device 10. The portable electronic device 10 further includes a controller 30, which is connected to a chip 32, such as a headset or headphone interface chip, which is integrated within the portable electronic device 10. The controller 30 can be implemented using a processor or dedicated circuitry. The chip 32 includes a switch matrix and jack configuration detect portion 34 which is integrated with a port 36 for receiving a jack 38 associated with a cable 40, such as a video cable or a headset cable. The switch matrix 34 includes a plurality of individual input and output ports 42 for receiving and transmitting signals with corresponding wires or lines 44*a* to 44*d* within the jack 38.

The wires 44*a* to 44*d* within the jack 38 represent signal lines, such as audio and/or video lines. The set of individual lines, typically four, although other jack configurations with other number of wires are contemplated, allow for communication between the portable electronic device 10 and a device located at the other end of the cable, such as a headset. In one embodiment, the wires 44*a* and 44*b* can be a pair of audio lines, the wire 44*c* can be a ground line and the wire 44*d* can be a microphone line. One of these lines may be used for communication and thereby serves as the communication bus for a single wire bus embodiment, typically the microphone line, for example. The remaining lines may be used for other functionality. Typically, one line will be used for ground while the remaining two lines may be used for headphone output. In another configuration, one line may be used for bus communication, one may be used for ground, a third line may be used for power and the last line is left for other purposes such as a separate clock line, for transmission of video signals or for other functionality. In other embodiments, a single wire bus may be used in digital or analog transmissions between devices, e.g. between a mobile device and a digital docking station.

Figure 3:
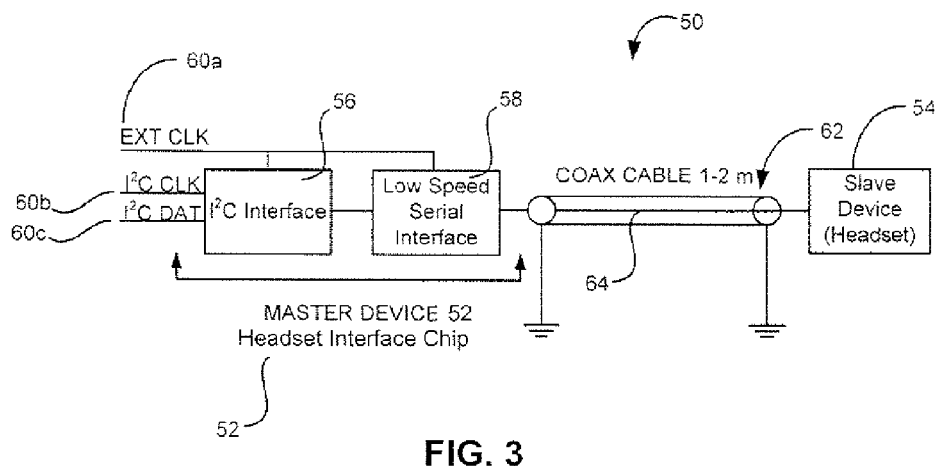
FIG. 3 is a schematic diagram of an example embodiment of a bus system.

Referring now to FIG. 3, shown therein is a schematic diagram of an example embodiment of a bus system 50. The bus system 50 includes a master device 52, such as a portable electronic device or a headset interface chip within a portable electronic device, and a slave device 54, such as a headset. Although only one slave device 54 is shown, it will be understood that multiple slave devices may be coupled to the bus system 50 for communication with the master device 52. Accordingly, the description provided herein for the slave device 54 can be generally applied to other slave devices that are connected to the bus system 50.

The master device 52 or the slave device 54 may include an Inter-Integrated Circuit ($I^2C$) interface 56 which is connected to a baseband processor or other mobile processing unit. The master device 52 or slave device 54 may also include an $I^2S$ or similar interface for digital audio data. Inputs, or input signals, 60 to the $I^2C$ interface 56 and a serial interface 58 may include, but are not limited to, an external clock signal 60*a* (EXT CLK), an $I^2C$ clock signal 60*b* ($I^2C$ CLK) and an $I^2C$ data signal 60*c* ($I^2C$ DAT). An output of the low speed serial interface 58 is connected to the slave device 54 via a cable 62, such as a co-axial cable. As described above, one of the wires or lines within the cable 62 provides a bus 64 that is used for communication between the slave device 54 and the master device 52 and can be seen as the single wire bus. The bus 64 may be used where the number of pins or wires is limited or for high reliability with respect to noise immunity.

In a single wire bus embodiment, a single wire may combine multiple functions, including, but not limited to, the transmission of both clock and data, which may be represented by a group of symbols. The first two time slots may be utilized to transmit one bit of data and clock synchronization information while the controlling master device 52 would tri-state (or drive weakly, e.g. open drain or open collector topology) subsequent time slots until the start of the next group of symbols. This allows both the master device 52 and any slave devices attached to the single wire bus 64 to write in any of these subsequent time slots except the two slots that are reserved for initial clock synchronization and data information in accordance with the teachings herein. As an example, the $I^2C$ interface 56 may retrieve and send data to the slave device 54 over the bus 64. In other embodiments, communication over the bus 64 may be controlled via a connection to a baseband processor or another processing unit. Accordingly, control of the master device 52 can be via the $I^2C$ interface 56, through another control interface or as part of a connection to the baseband processor or other processing unit that has the master device 52 perform various operations such as, but not limited to, PING (e.g. to check bus status), READ (e.g. to read from a register inside a device attached to the bus 64), WRITE (e.g. to write to a register inside a device attached to the bus 64) and FUNCTION (e.g. to start the execution of a specific routine inside a device attached to the bus 64) commands or operations, which are described in further detail below.

In operation, a synchronization (sync) signal, control signals of information, data, a clock and possibly also power that is transmitted between the master device 52 and the slave device 54 over the bus 64. Accordingly, the bus 64 allows continuous operation of a number of external devices and all devices are synchronized by the same clock signal. The clock signal can be used as a sampling clock for internal circuits such as sigma-delta converters or for continuous operation of a complex logic circuit. In other embodiments, there may be instances in which the clock signal is kept at a steady level such as static low logic level or a static high logic level to save power when there is no activity on the bus 64. The clock and data information may be transmitted during the first two data time slots and during the remaining data time slots, an internal clock recovery circuit inside a slave device may be used to keep track of the correct time to sample and drive the bus 64. The output from this clock recovery circuit may be used as the sampling clock for internal circuits within the slave device.

The master device 52 is capable of generating framing information in order to allow the slave device 54, or multiple slave devices, to be synchronized to the bus 64. In at least one embodiment, the frame length may be determined by an 8-bit register that provides a separation distance between the start of each block of command data. In another embodiment, the unit of measure is a nibble which equals four (4) bits.

In one example embodiment of a communication protocol that can be used with the increased bandwidth encoding schemes described herein, a frame is defined to include three control words: a synchronization word (i.e. the S word) and two command words (i.e. the X command word and the Y command word) for sending commands to and from the slave devices. The command words may either be separated by a given number of time slots or transmitted together in a single group in a single column for a data frame (this is described in more detail later with respect to FIGS. 12a and 12b).

The size of the components that communicate via the bus 64 may be decreased by using at least one embodiment of the increased bandwidth encoding scheme described herein. For example, if implemented in the portable electronic device 10 of FIG. 2, the increased bandwidth encoding scheme in accordance with the teachings herein allows the bus 64 to transmit the clock signal and data over a single wire which reduces the number of pins that are occupied in the chip 32 thereby allowing the other pin ports 42 to be used for other functionality or to reduce the total pin-count, silicon area or cost of the chip at the Printed Circuit Board (PCB) level.

In general, the slave device 54 may indicate that it wishes to communicate with the master device 52 by changing the signal during a PING (i.e. status) operation. In this case, data can then be transmitted between the slave device 54 and the master device 52 via a READ, WRITE or FUNCTION operation. The master device 52 can also initiate a READ, WRITE or FUNCTION operation on its own. In order to initiate the communication, the master device 52 and the slave device 54 are synchronized to each other.

The synchronization and command words, collectively referred to as control words, may be 16 bits long and are generally sent out during every frame. In other embodiments, the length of the control words may be some other length, e.g. 8 bits and the number of control words in a frame may differ from three. The frame format may vary according to application and in some cases may be programmed. For example, In at least one embodiment, there may be one mode of operation in which the data bits are interleaved between the individual bits in each control word; one benefit of this data interleaving is the support of multiple low latency bitstream data channels. In some embodiments, control data may be interlaced with audio data or other data (i.e. "bitstream" mode) and in other embodiments the interface may transfer control, synchronization and audio data in separate blocks and not interlaced, "word" mode, similar to the transfer of TDM data.

In an example embodiment, the master device 52 may perform several control functions including: status monitoring (i.e. a PING operation), reading a register (i.e. a READ operation), writing to a register (i.e. a WRITE operation) and executing functions (i.e. a FUNCTION operation). The type of operation is determined by the master device 52. In some embodiments, the master device 52 is controlled by a system controller (not shown). In these cases, the interface between the master device 52 and the system controller can be implemented using an I²C bus or by integrating these two system components into one device (i.e. a processor).

In order to communicate with the slave device 54, the master device 52 transmits a synchronization (i.e. sync or S) word that has synchronization data that the slave device 54 (or devices) may use to synchronize their internal timing, or their internal clock, with the master device 52 and consequently the bus 64 as well. In general, the first control word that the master device 52 transmits in a frame is the S word. Accordingly, the S word can be used to initiate the start of a frame. The first bit that is transmitted is the S15 bit followed by the S14 bit and so on. The bits may be transmitted immediately after each other or with a constant gap between the transmission of these bits.

The various embodiments associated with the increased bandwidth encoding, in accordance with the teachings herein, can be used to enhance data communication by changing how the clock signal is transmitted on the bus 64 or a non-wired communication channel. For example, it is possible to use one or more time slots that are normally used for data transmission in order to add redundancy to an increased bandwidth signal and thereby convey clock information that is multiplexed with data in the increased bandwidth signal. Therefore, the data itself is used to convey a clock edge. In addition, one time slot is used to transmit each of the data bits. This allows for an increase in efficiency for data transfer as will now be described. This also results in less power consumption and the bandwidth utilized to convey the clock information can be reduced.

The increased bandwidth encoding schemes described herein may also be used for high bandwidth applications with low power consumption. An example of this is ultrasonic microphones requiring high bandwidth and low power consumption.

The increased bandwidth encoding techniques described herein may be used if bitstream data is being transmitted or if word data is being transmitted over a single wire or using a single non-wired transmission channel. This technique also allows for data channels to be controlled independently of one another as the technique to encode clock information in the increased bandwidth signal is not constrained to use multiple bits of data from a given channel but may use one data bit from each different channel if so desired when transmitting the clock information. Similarly, this increased bandwidth encoding scheme can be used with multiple sources. In the increased bandwidth encoding scheme, a clock transition may take place every N bits and therefore the increased bandwidth encoding scheme allows for synchronization to be maintained without using a second wire for separate clock and data lines.

Figure 4A:
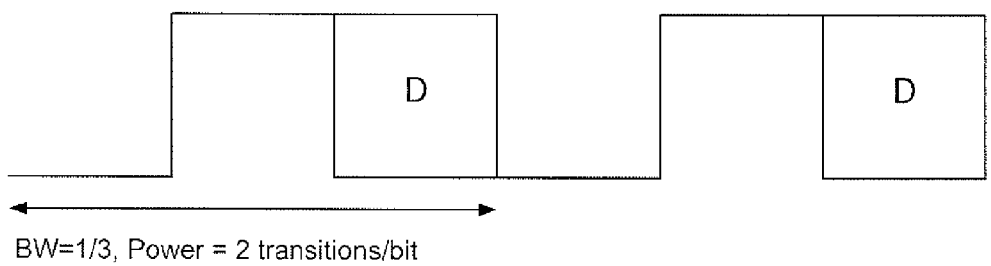
FIG. 4a shows an example of an embodiment of an encoding scheme utilizing two time slots for clock information and one time slot for a data bit and sending clock information before each data bit.

Referring now to FIG. 4a, shown therein is an example embodiment of an encoding scheme utilizing two time slots for clock information and one time slot for a data bit and sending clock information before each data bit. This encoding scheme may be transmitted on a single wire bus or a single wireless or optical communication channel. The clock is defined by the rising edges, while the data is defined by the falling edges. This has been described more in published U.S. patent application 2012/0144078, entitled "Single wire bus system", which for purposes of a US patent application is hereby incorporated by reference for any purpose, however, if this published patent application conflicts with the present explicit disclosure then the present disclosure controls. Accordingly, each data bit is transmitted using three time slots (in other words a bus cycle includes three time slots): one time slot is used for sending a clock low signal, one time slot is used for sending a clock high signal and one time slot is used for the actual data bit D. Accordingly, the leading edge is used to convey clock information while the trailing edge is used to convey data information. In this case, the data bandwidth is ⅓ as compared to if all time slots were available to transmit data and the power consumption is related to 2 transitions per bit (one transition for low-high and one transition for high-low).

Figure 4B:
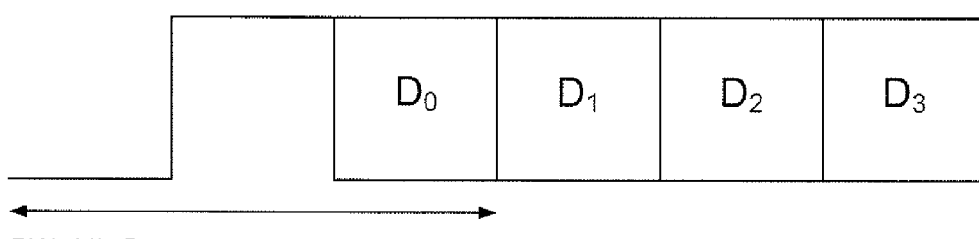
FIG. 4b shows another example embodiment of an encoding scheme utilizing two time slots for clock information and four time slots for data.

Referring now to FIG. 4b, shown therein is an example of another encoding scheme that utilizes two time slots for clock information and four time slots for data. Again, two time slots are utilized to convey the clock information (a first data slot signals a low clock signal and a second data slot signals a high clock signal). In this case, each group of data has 6 time slots, the data bandwidth is ⅔ as compared to if all time slots were available to transmit data and the power consumption is related to 0.875 transitions per bit. Thus, the bandwidth available for data transfer is higher and the power consumption is lower as compared to the encoding scheme shown in FIG. 4a, while the same low-to-high transition is used to signify clock information, which may be used for synchronization.

Figure 4C:
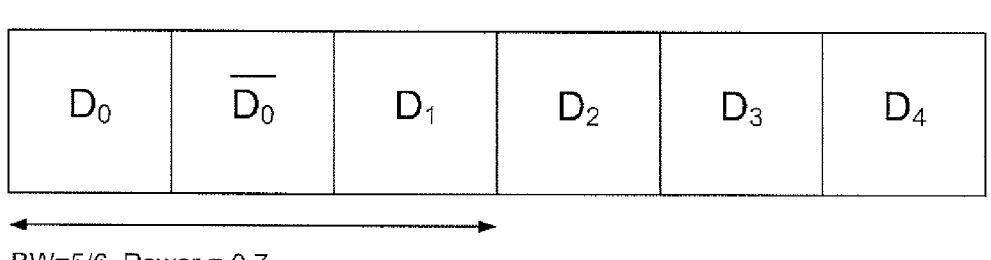
FIG. 4c shows an example embodiment of an increased bandwidth encoding scheme utilizing one time slot for clock information and four time slots for data thereby increasing the bandwidth and lowering the power consumption.

Referring now to FIG. 4c, shown therein is an example embodiment of an increased bandwidth encoding scheme utilizing one unique time slot for clock information and five unique time slots for data thereby increasing the bandwidth and lowering the power consumption. In this case, one data bit out of a group of data bits is repeated once but transmitted the second time with an alternate polarity (i.e. it is bit inverted), thereby creating a clock transition for every group of N data symbols. In this example, N is 6. In other words, the first bit of a string of data is repeated a second time with opposite polarity, in order to convey an edge of a clock signal. One of the data bits is transmitted twice, once inverted and once normal (or vice-versa), to provide a clock transition for every group of data and providing devices with a transition to use in order to lock onto the bus. Accordingly, $D_0$ and $\overline{D_0}$ provide the clock edge as well as transmit one bit of data (i.e. $D_0$). In an alternative embodiment, these two bits could be transmitted in the opposite order, e.g., transmit $\overline{D_0}$ first and then $D_0$. The data bit $D_0$ is transmitting information such as audio information, control information, synchronization information or other information. However, since clock information is transmitted for every group of symbols transmitted, the first data slot represented by $\overline{D_0}$ first and then $D_0$ are in the direction from a master device to a slave device and can therefore not be used to receive data from a slave device. A good use of this bit may therefore be to transmit control data from the master device to a slave device or audio data from the master device to a slave device, but not for receiving any data from a slave device at the master device. Therefore, the data bit $D_0$ can have any value regardless of the activity on the bus 64. In this example embodiment, in six time slots there are now five bits of data that are transmitted.

In the example of FIG. 4c, the data bandwidth is ⅚ (five transmitted bits per six data slots) and the power consumption is related to 0.7 transitions per bit. In order to make this determination it is assumed that the data bits are not correlated. Therefore, going from $\overline{D_0}$→D1, D1→D2, D2→D3, D3→D4 and D4→D0 there is a probability of ½ of a transition (if the next bit is the same value, there is no transition). The transition from D0 to $\overline{D_0}$ has a probability of 1 of a transition. Therefore, the total number of transitions is 5*0.5+1=3.5. There are a total of 5 bits that are transmitted. Therefore, the total power consumption per bit is 0.7 transitions per bit (i.e. 3.5/5). Accordingly, this new increased bandwidth encoding scheme to convey clock information together with data information results in a greater bandwidth (⅚ as compared to all time slots allocated to data) and lower power consumption as compared to the bandwidths of ⅓ (for FIG. 4a) and ⅔ (for FIG. 4b). This is achieved since the increased bandwidth encoding schemes, in accordance with the teachings herein, can be used to extend the width of the data field thereby allowing a higher bandwidth as well as enabling a lower power consumption by decreasing the number of logical shifts. Accordingly, the increased bandwidth encoding scheme in FIG. 4c is suited for bus systems that use high bandwidth and have low power consumption and also use a single wire or medium to transmit information. In other embodiments, the transmission medium could be a single optical or wireless communication channel. In alternative embodiments, the number of time slots following the initial time slots used to transmit D0 and $\overline{D_0}$ is a different integer than four.

In addition, with the increased bandwidth encoding scheme, as described herein, it should be noted that all time slots except for those that are used to transmit D0 and $\overline{D_0}$ can still be driven individually by different devices that communicate with respect to one another on the single wire bus 64 or through a single wireless or optical communication channel.

Furthermore, in at least one embodiment of the increased bandwidth encoding schemes described herein utilizes only two states to transfer the clock and data information. Essentially, phase modulation of a carrier may be used to ensure clock and data information are always present in a series of data bits that are transmitted using the increased bandwidth encoding scheme.

It should be noted that a PLL may be used in the receiver of a device in order to extract the clock information from the stream of data generated using the increased bandwidth encoding scheme. Furthermore, a PLL that utilizes a single clock edge (e.g. a low-to-high or a high-to-low) transition, such as type III or type IV phase detectors, may utilize a small delay line together with an XOR gate in order to find the transition for every series of data bits. In this application, the delay could conveniently be less than or equal to one time slot and the direct and the delayed signal may be feed to an XOR gate and the output from the XOR gate may be provided to the phase detector.

Alternatively, an internal clock signal plus detection of events (i.e. by counting) or comparison of events (i.e. by having an analog delay) may be used in the receiver of a device in order to extract the clock information from the stream of data generated using the increased bandwidth encoding scheme.

Figures 5A, 5B:
FIG. 5a shows an example embodiment of an encoding scheme that uses two time slots with a high to low transition to represent a logic 0.
FIG. 5b shows an example of the encoding scheme of FIG. 5a using two time slots with a low to high transition to represent a logic 1.
Figure 5C:
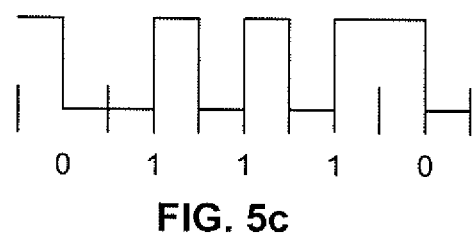
FIG. 5c shows a series of bits "01110" using the encoding scheme of FIGS. 5a and 5b.
Figure 5D:
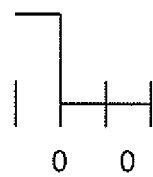
FIG. 5d shows an example embodiment of another increased bandwidth encoding scheme that uses two time slots for a first data bit and a clock edge and then one time slot for each remaining data bit where the first data bit is a logic 0.
Figure 5E:
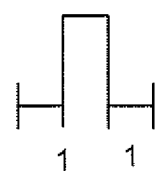
FIG. 5e shows another example of the increased bandwidth encoding scheme of FIG. 5d using two time slots for a first data bit and a clock edge and then one time slot for each remaining data bit where the first data bit is a logic 1.
Figure 5F:
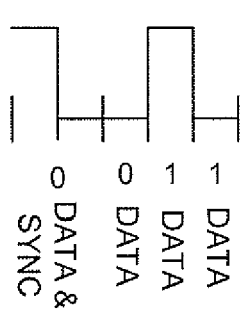
FIG. 5f shows another example of the increased bandwidth encoding scheme of FIGS. 5d and 5e using two time slots for a first data bit and a clock edge and then one unique time slot for each remaining data bit where the first data bit is a logic 0 and the remaining data bits are '011'.

FIGS. 5a to 5c illustrate encoding schemes that can be modified in accordance with the increased bandwidth encoding schemes to generate increased bandwidth signals as shown in FIGS. 5d to 5f.

FIG. 5a shows an example embodiment of an encoding scheme that uses two time slots with a high to low transition to represent a logic '0' value. Every data bit is transmitted using two time slots and thereby include clock information together with every data bit transmitted. FIG. 5b shows an example of the encoding scheme of FIG. 5a using two time slots with a low to high transition to represent a logic '1' value. It should be noted that in other embodiments the signal transition shown in FIG. 5a can be used to represent a logic '1' value and the signal transition shown in FIG. 5b can be used to represent a logic '0' value. The bits shown in FIGS. 5*a* and 5*b* may be the first bit for a group of bits (bits may also be referred to as symbols) and the length of the groups of bits may be anywhere from 1 to M where M is an integer number that is greater than or equal to 1.

Referring now to FIG. 5*c*, shown therein is a series of data bits "01110". In each of the examples of FIGS. 5*a* to 5*c*, each of the data bits uses two time slots to provide a clock edge and indicate a logic value. Therefore every bit is represented using two time slots. This is a low bandwidth encoding scheme compared to the encoding scheme shown in FIGS. 5*d* to 5*f*.

Referring now to FIG. 5*d*, shown therein is an example embodiment of another increased bandwidth encoding scheme that uses two time slots for a first data bit and a clock edge and then one time slot for each remaining data bit. In this example, the first data bit has a logic '0' value.

Referring now to FIG. 5*e*, shown therein is another example of the increased bandwidth encoding scheme of FIG. 5*d* using two time slots for a first data bit and a clock edge and then one time slot for each remaining data bit. In this example, the first data bit has a logic '1' value.

For the increased bandwidth encoding scheme shown in FIGS. 5*d* and 5*e*, the use of a double time slot for the first data bit ensures a clock carrier will always be transmitted no matter what data bit (i.e. a logic '0' or a logic '1') is transmitted. Accordingly, with the increased bandwidth encoding scheme of FIGS. 5*d* and 5*e*, the number of time slots is reduced per data bit, except for the first data bit. This is more easily seen in the example of FIG. 5*f*. Furthermore, since clock information is only transmitted in the first two time slots, all subsequent time slots can be used independently by different transmitters. This allows full bi-directional bus operation and not just a single ended connection from a single transmitter to one or more receivers as when using certain prior art encoding techniques.

Referring now to FIG. 5*f*, shown therein is another example of the increased bandwidth encoding scheme of FIGS. 5*d* and 5*e* using two time slots for a first data bit and a clock edge and then one unique time slot for each remaining data bit. In this example, the first data bit has a logic '0' value and the remaining data bits are '011' and encoded using NRZI encoding. Therefore the group of data bits or symbols that are transmitted is '0011'. In other embodiments, the data bits may be encoded using direct logic signaling (i.e. a logic zero is always transmitted by either a low or high voltage level irrespective of the previous transmitted symbol).

In the example embodiment of the increased bandwidth encoding scheme shown in FIGS. 5*d* to 5*f*, the first data bit may be transmitted by a clock source, such as the master device 52 for example (although not always), while the next three data bits can be transmitted by any other source or device.

In the example embodiment of the increased bandwidth encoding scheme shown in FIGS. 5*d* to 5*f*, a logic '0' value may be transmitted as no change in voltage level and a logic '1' value may be transmitted as a change in voltage level. Accordingly, the very first bit that is transmitted either has a 1-0 transition (e.g. a high to low transition) to indicate a logic '0' value and a clock edge, or a 0-1 transition (e.g. a low to high transition) to indicate a logic '1' value and a clock edge. Accordingly and assuming the master device only transmits in the first two time slots, it would transmit 01ZZZZ. If logic zeros are transferred as no-change in voltage level and logic ones as a change in voltage level (NRZI encoding) or vice-versa, then it is possible for more than one transmitter to signal in the same time slot. This allows many devices to write to the same time slot since all of the devices may have a tri-state output except for the device that is writing a logical one to the bus. Therefore, there cannot be a physical bus collision and there is no need for pull-up or pull-down resistors that would result in higher power consumption and lower speed. For any unused time slots, the appropriate output drivers may be tri-stated while a bus holder may be used to maintain the previous value that was written to the bus.

In an alternative embodiment of an increased bandwidth encoding scheme, a logic '1' value may be transmitted as no change in voltage level and a logic '0' value may be transmitted as a change in voltage level. The very first bit can be transmitted either has a 1-0 transition (e.g. a high to low transition) to indicate a logic '1' value and a clock edge, or a 0-1 transition (e.g. a low to high transition) to indicate a logic '0' value and a clock edge or vice-versa.

In another alternative embodiment of an increased bandwidth encoding scheme, it is possible to look the previous data bit that is sent before the first data bit in a current group or series of data bits and then let the series of data bits depend on this previous data bit. The previous data bit is the last data bit of the previous group or series of data bits that was transmitted. With this increased bandwidth encoding scheme, if the previous data bit was a logic '0', then the first data bit in the current series of data bits is transmitted as 1-0. Alternatively, if the previous data bit was a logic '1', then the first data bit in the current series of data bits is transmitted as 0-1. Again the opposite transition scheme could have been chosen to signify a logic '1' or a logic '0' in the first data bit in the current series of data bits. The subsequent data bits would be transmitted as shown above in the example of FIG. 5*f*.

Figure 6:
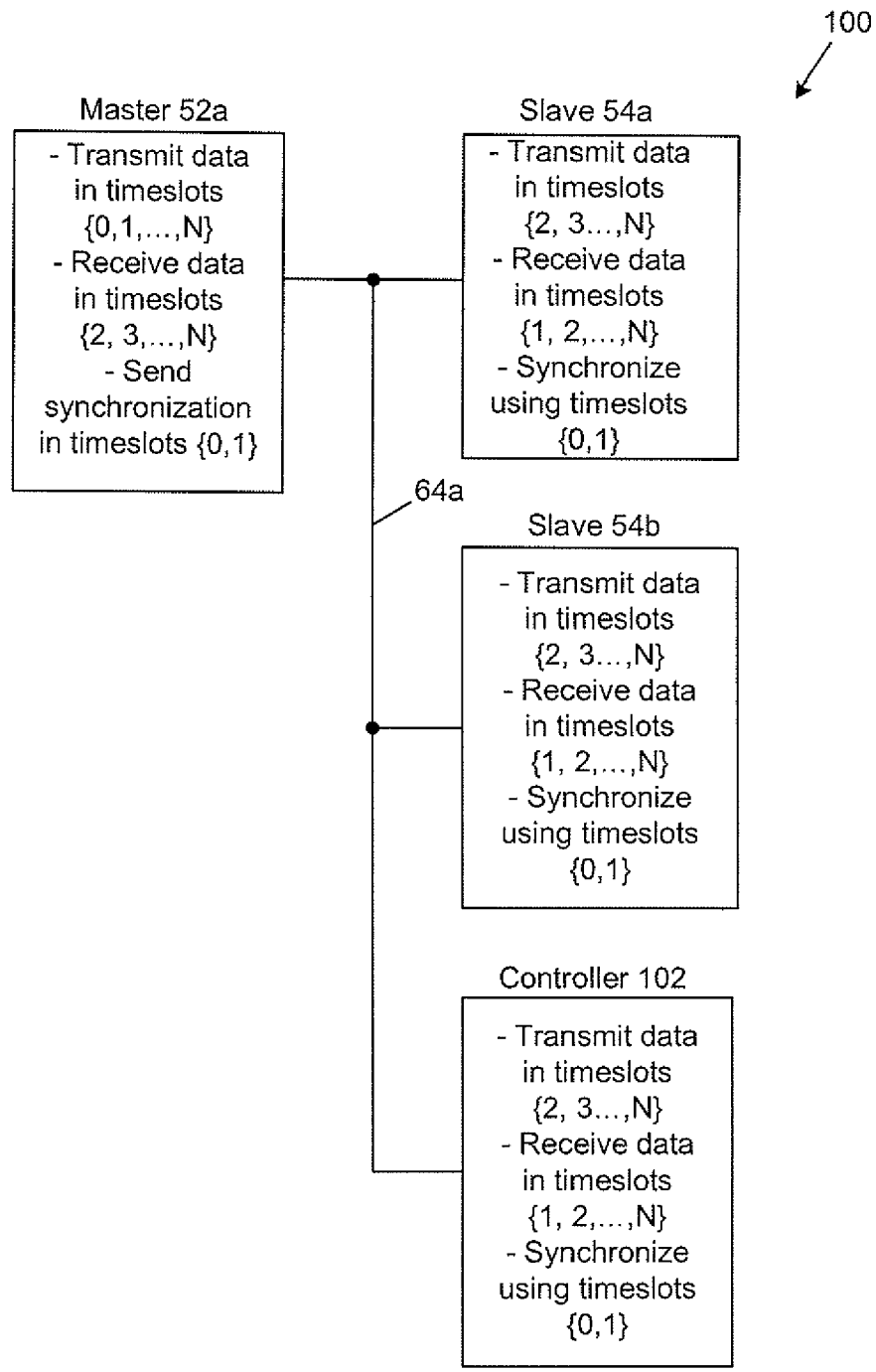
FIG. 6 shows an example embodiment of several devices that communicate with one another using an increased bandwidth encoding scheme in accordance with the teachings herein.

Referring now to FIG. 6, shown therein is an example embodiment of a system 100 with several devices that may communicate with one another using an increased bandwidth encoding scheme in accordance with the teachings herein. A master device 52*a*, slave devices 54*a* and 54*b* and a controller 102 communicate with one another using a bus 64*a* and an increased bandwidth encoding scheme. In some cases, the controller 102 is optional. In some cases, the controller 102 can act as a slave device. In other cases, the controller 102 can act as a master device. In some cases, the controller 102 may act as a slave device and lock on to the bus 64*a* as a slave device, but with the additional capability of being able to send out commands (but not framing information) like the master device 52*a*. In this example embodiment, the controller 102 will act as a slave device.

The time slots for data transmission (e.g. bits 2 to N) on the bus 64*a* may or may not be defined by a framer which is a circuit that sends out clock and synchronization information. In some embodiments, the framer may be limited to sending out frame synchronization information and a separate circuit will provide the clock information. In some instances the framer may merely provide information about the start of every frame. The framer is normally contained in the master device 52*a* but may be contained in other devices in other embodiments. The $N^{th}$ bit is the last bit transmitted in a series of data bits. When the $N^{th}$ bit is transmitted for a series of data bits and a later series of data bits needs to be transmitted, the framer takes over and sends synchronization information with a replicated inverted version of a data bit to signify a clock edge. For example, a first bit D0 of the later series of data bits and an inverted version $\overline{D0}$ of the first bit of the later series of data bits can be sent as {D0, $\overline{D0}$} or as {$\overline{D0}$, D0} to signify a clock edge. As another example, an inverted version of the last bit DN of the current series of data bits that were just transmitted can be sent as the first bit in the later series of data bits to be transmitted to signify a clock edge as {DN, $\overline{DN}$}.

With the increased bandwidth encoding scheme and an appropriate communication protocol, such as that described in U.S. patent application Ser. No. 12/958,942 or in U.S. patent application Ser. No. 13/784,457, data can be sent in different time slots in the same series of data bits by one or more devices attached to the bus 64a thereby providing two-way communication between the master device 52a and one or more slave devices 54a, 54b and 102. The contents of both U.S. patent application Ser. No. 12/958,942 and U.S. patent application Ser. No. 13/784,457 are hereby incorporated by reference.

Therefore, the time slots 0 and 1 for each series of data bits are reserved for the framer which sends out both synchronization information (i.e. time slots 0, 1) and one data bit (i.e. time slot 1) while the subsequent bits can either be transmitted from the master device 52a to one or more of the slave devices 54a, 54b and 102 or from one or more slave devices 54a, 54b and 102 to the master device 52a or to other slave devices. Since the data may be transferred from the master device 52a to one or more slave devices 54a and 54b in these two time slots, the data may be audio or some other information that does not require a slave device to respond to. Therefore, any command information (e.g. register read and writes) may be located in a different time slot, e.g. time slot number 3 or the last time slot at the end of a group of symbols.

In some embodiments, depending on the communication protocol, the master device 52a may be able to issue commands to the slave devices 54a, 54b and 102 that receive information from the master device 52a. In other embodiments, depending on the communication protocol, the system configuration may be fixed, i.e. the configuration of the slave devices and the master device 52a does not change during operation and they will transmit and listen to the same time slots as defined initially during power-up.

It should be noted, that in some embodiments, the controller 102 may functions the same way as a slave device, i.e. receives timing information, commands and data from the master device 52a, but the controller may also be able to issue commands like the master device 52a.

In one example embodiment, the master device 52a may be configured to transmit clock timing information in time slots 0 to 1, transmit data in any of time slots 1 to N and receive data in any of time slots 2 to N. Furthermore, in this example embodiment, the slave devices 54a, 54b and 102 may be configured to transmit data in any of time slots 2 to N, receive data in any of time slots 1 to N and synchronize with the framer (e.g. master device 52a) using bits transmitted in time slots 0 to 1. In general, to prevent bus crashes, the slave devices 54a, 54b and 102 do not transmit data while the master device 52a is sending out the bits used for synchronization in time slots 0 to 1. It should be noted that data transmitted on the bus 64a in the time slots 1 to N are considered to be a series of data bits.

Figure 7A:
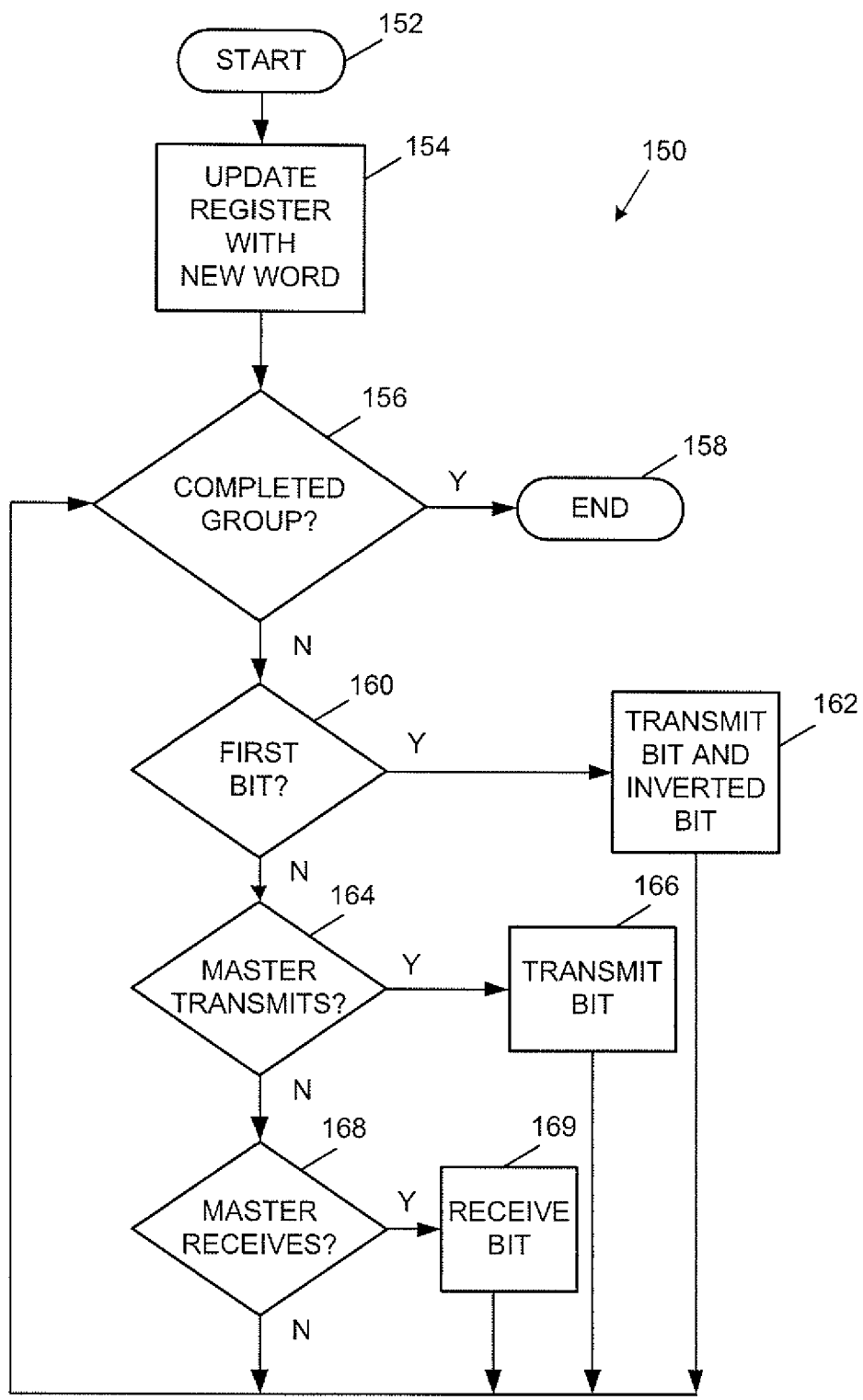
FIG. 7a is a flowchart of an example embodiment of a method to generate and receive an increased bandwidth signal in accordance with the teachings herein.

Referring now to FIG. 7a, shown therein is a flowchart of an example embodiment of a method 150 to generate an increased bandwidth signal in accordance with the teachings herein. The method generally starts at 152 when a communication channel, such as the bus 64a is being initialized for use. In this case, before any actual data is transmitted, the time slots are not activated and the master device and slave device(s) will not output data. Method 150 may be used by a master device.

At 154 a data register is updated with a new digital data word which is a series of data bits, such as '0110111010101100' for example (other word lengths can be used).

At 156, the method 150 determines whether the entire digital data word has been transmitted. It should be noted that in this case the digital data word may be referred to as a series of data bits or a group of data herein. This determination of whether the entire digital data word has been transmitted may be done by using a counter or an accumulator which maintains a count that is incremented by one when each data bit is transmitted. The count may then be compared to the word length. When the count equals the word length then all data bits have been transmitted. If all of the data bits have been transmitted, the method 150 goes to 158 where the method 150 ends. In an alternative embodiment, the method 150 can check to see if another digital data word or another group of data bits are to be transmitted and if so loop back to 154. If not all of the data bits have been transmitted the method 150 proceeds to 160.

At 160, the method 150 determines whether or not the data bit to be transmitted is the first data bit from the group. If the decision at 160 is true, then the method 150 proceeds to 162 where the first data bit followed by an inverted version of the first data bit is transmitted. Alternatively, the inverted version of the first data bit may be transmitted followed by the first data bit.

If the decision at 160 is false, then the method 150 proceeds to 164 where it is determined whether the master device has to transmit a data bit in the current time slot (i.e. if the master device is active during this time slot) as there may be situations in which the master device is supposed to receive or at least listen to the bus in order to receive a data bit during the current time slot. If it is determined that the master device is to transmit during the current time slot, then method 150 proceeds to 166 at which point the data bit is transmitted during the current time slot.

If it is determined at 164 that the master device is not to transmit during the current time slot but is to receive during the current time slot, the method 150 proceeds to 168. At 168 it is determined whether the master device is to receive a data bit. If this is true, the method 150 proceeds to 169 where the master device receives the data bit. If this condition is false, the method 150 proceeds to 156.

After acts 162, 166 or 168, the method 150 loops back to 156 in order to transmit the rest of the data bits from the register.

In an alternative embodiment, the last bit of the previous digital data word that was transmitted may be retained such that the first bit that is transmitted in a current series of data bits is the inverted version of this last bit to signify a clock edge for the current series of data bits that can be used for timing information. This embodiment has the advantage, that the second bit that is transmitted can be transmitted either by the master device or by a slave device, but is essentially the same encoding except with a different numbering of the bits.

In an alternative embodiment, a method of encoding a series of data bits to increase bandwidth comprises selecting a data bit, generating an inverted version of the selected data bit, positioning the inverted version of the selected data bit in a consecutive fashion with respect to the selected data bit to signify an edge of a clock signal, and transmitting or receiving the inverted version of the selected data bit and subsequent data bits each in single unique time slots thereby providing an increased bandwidth signal with clock information for the series of data bits.

In an alternative embodiment, a method for generating data for communication between devices comprises determining time slots for sent and received data bits according to an increased bandwidth encoding scheme, selecting a data bit at a beginning of a current transmission period or at an end of a previous transmission period, generating an inverted version of the selected data bit, positioning the inverted version of the selected data bit and the selected data bit in two consecutive time slots to convey an edge of a clock signal; and transmitting or receiving subsequent data bits at unique single time slots after the two time slots having the inverted version of the selected data bit and the selected data.

This method may further comprises positioning the inverted version of the selected data bit in a first time slot for a current transmission period if the selected data bit is at the ending of a previous transmission period or positioning the selected data bit and the inverted version of the selected data bit consecutively in first and second time slots for the current transmission period if the selected data bit is at the beginning of the current transmission period.

Figure 7B:
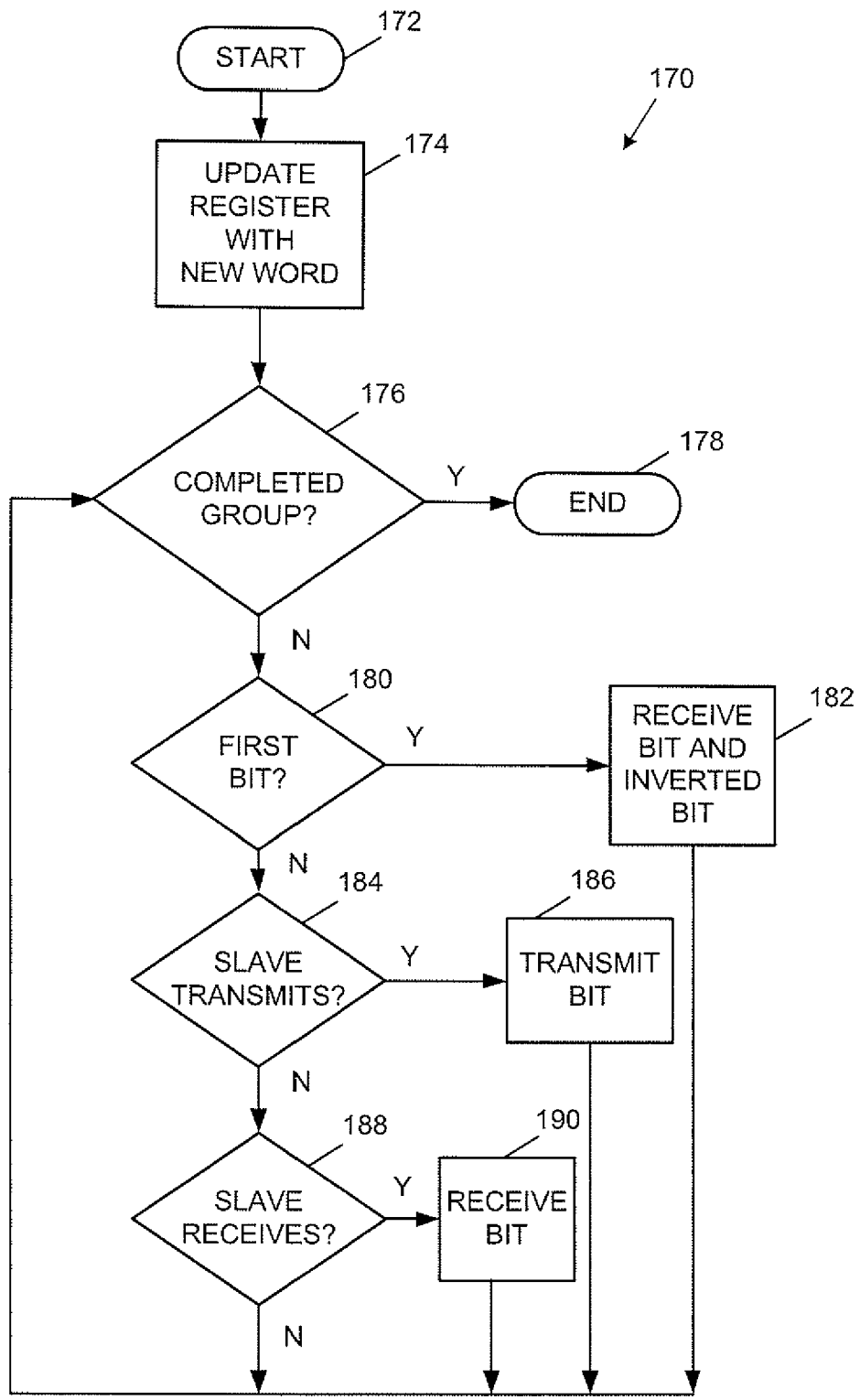
FIG. 7b is a flowchart of another example embodiment of a method to receive and generate an increased bandwidth signal in accordance with the teachings herein.

Referring now to FIG. 7b, shown therein is a flowchart of another example embodiment of a method 170 to generate an increased bandwidth signal in accordance with the teachings herein. Method 170 may be used by a slave device or a bus controller (an alternate master device that is locked onto the bus that is able to submit command onto the bus). Method 170 is similar to method 150 except that at 182 the slave device receives a data bit and the inverted bit (in either order). This is because only a master device may transmit the two data bits that are used to convey clock information and all slave devices are configured to receive data bits during these time slots. Otherwise, method 170 is similar to method 150 including the variant embodiments of method 150.

Figure 8:
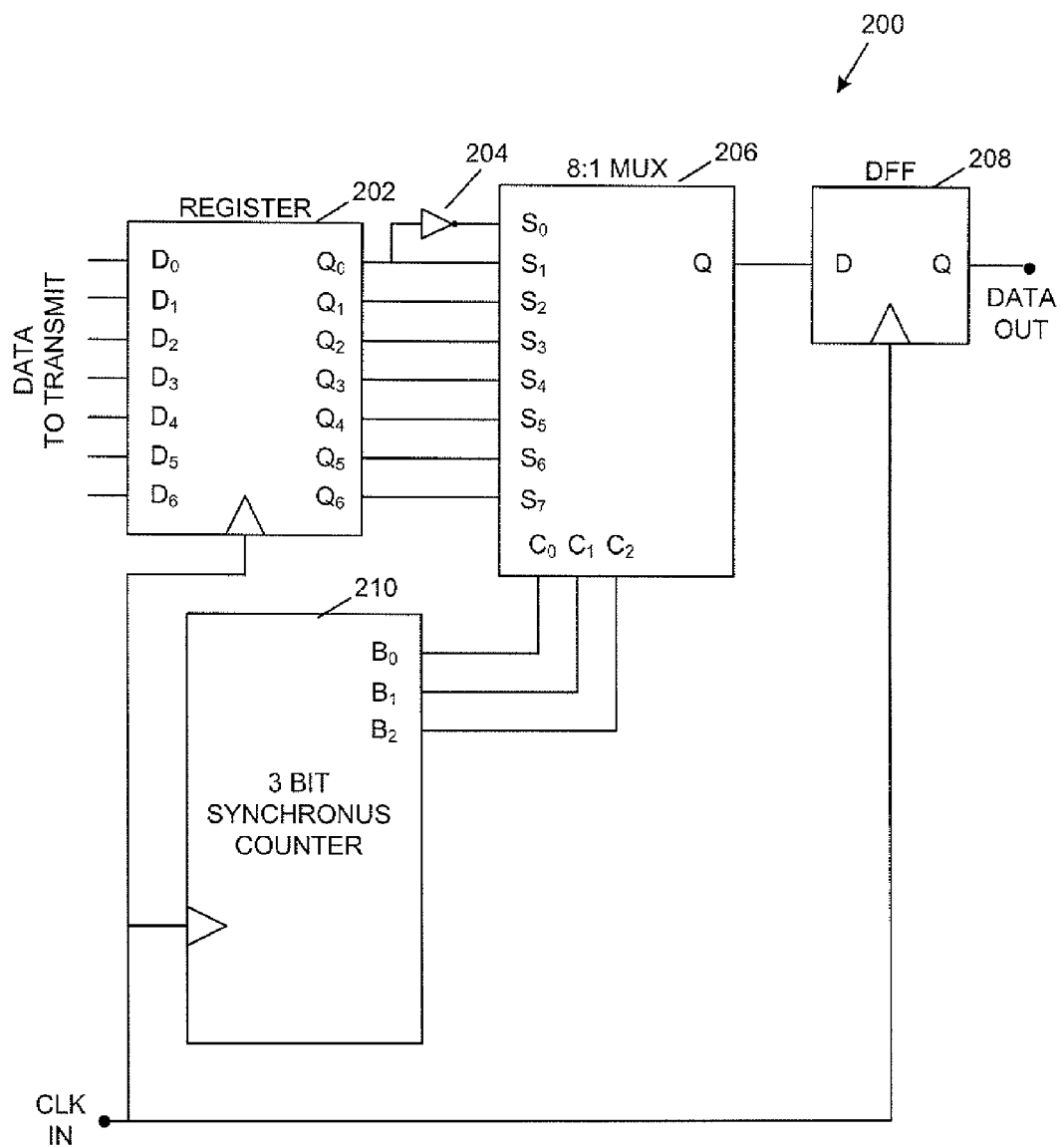
FIG. 8 is a block diagram of an example embodiment of a signal generation unit for generating an increased bandwidth signal in accordance with the teachings herein.

Referring now to FIG. 8, shown therein is a block diagram of an example embodiment of a signal generation unit 200 that can generate an increased bandwidth signal in accordance with the teachings herein. It should be noted that other configurations may be used for the signal generation unit 200; for instance, other elements may be used depending on the particular communication protocol that incorporates increased bandwidth encoding in accordance with the teachings herein. The example embodiment that is shown assumes that only the master device transmits data. Otherwise, in alternative embodiments where this assumption is not the case, the output may be tri-stated when other devices attached to the bus transmit data on the bus.

The signal generation unit 200 comprises an input terminal that receives data to transmit, a register 202, an inverter 204, a multiplexer 206, an output stage, which in this case is a D flip flop 208, and a synchronous counter 210. The signal generation unit 200 may be coupled through the interface to a device that includes a framer such as a master device, a controller or another device that will provide the data to transmit, for example. If the device is not a master device, or if devices other than the master device are active on the bus, the output may be tri-stated or disabled when other drivers are signaling. The input terminal and the output terminal of the output stage can be coupled to this interface to receive and send signals. The input terminal may be a series of single pins or single ports and the output terminal of the output stage may be a single pin or a single port.

In general, the signal generation unit 200 is configured to select a data bit, generate an inverted version of the selected data bit and position the inverted version of the selected data bit in a consecutive fashion with respect to the selected data bit to signify an edge of a clock signal with the selected data bit, the inverted version of the selected data bit and subsequent data bits each being transmitted or received in a single unique time slot thereby providing an increased bandwidth signal with clock information for a series of data bits being transmitted.

In general, the register 202 is configured to receive the series of data bits (i.e. data to transmit) that are to be transmitted. The register 202 generally has N elements to hold N data bits. The value of N can vary depending on the communication protocol. The register 202 also receives the clock input signal CLK IN which provides timing for the register to provide the series of data bits to the inverter 204 and the multiplexer 206.

The inverter 204 is coupled to the register 202 and is configured to receive the selected data bit and generate an inverted version of a selected data bit. In this example, the selected data bit is D0.

The multiplexer 206 is coupled to the register 202 and the inverter 204. The multiplexer 206 is configured to receive the series of data bits from the outputs Q0 to Q6 of the register 202 and the inverted version of the selected data bit from the output of the inverter 204. In this example, the inverted version of the selected data bit is received at a first input S0 of the multiplexer 206 which is adjacent to a second input S1 of the multiplexer 206 that receives the inverted version of the selected data bit. In an alternative embodiment, the selected data bit may be received at a first input S0 of the multiplexer 206 and the second input S1 of the multiplexer 206 may receive the inverted version of the selected data bit. The remaining data bits for the series of data bits are received at inputs S2 through S7 consecutively. The multiplexer 206 also has input pins C0 to C2 to receive a control signal from the synchronous counter 210 to control which data bit from the inputs S1 to S7 is sent to the output Q of the multiplexer 206 for a certain time slot.

The counter 210 is coupled to the multiplexer 206 and to the clock input signal CLK IN. The counter 210 provides a count input (e.g. bits C0, C1, C2) to the multiplexer 206 to cause the multiplexer 206 to output the series of data bits and the inverted version of the selected data bit with each bit being sent in a unique time slot with the inverted version of the selected data bit and the selected data bit being sent consecutively to produce the increased bandwidth signal. The timing of the time slots is determined by the clock input signal CLK IN. The counter 210 counts the number of data bits that have been transmitted in the current series of data bits to be transmitted including the inverted version of the selected and when the count gets to N=7, it re-starts the count from 0 for the next series of data bits to transmit.

It should be noted that another configuration of logic gates may be used to provide the proper synchronization reset signal to the counter 210 depending on the number of bits that are to be transmitted. Furthermore, more logic may be necessary if more than one transmitter is transmitting on the bus.

The output stage, which includes the D flip flop 208 in this example embodiment, is configured to receive multiplexed data from the output of the multiplexer 206 as well as the clock input signal CLK IN. The output stage is configured to send the multiplexed data to a downstream device or element, such as the interface, with each bit being sent in a unique time slot and the timing of the time slots being defined by the clock input signal CLK IN. The use of the output stage helps to ensure that a clean output signal is generated by the signal generation unit 200.

For the example embodiment shown in FIG. 8, the inverted version of the selected data bit precedes the non-inverted version of the selected data bit when outputted by the output stage.

However, it should be understood that the signal generation unit 200 can be alternatively implemented so that the non-inverted version of the selected data bit precedes the inverted version of the selected data bit when outputted by the output stage.

Furthermore, for the example embodiment shown in FIG. 8, the selected data bit is a first data bit D0 in a current series of data bits being currently transmitted.

However, it should be understood that the signal generation unit 200 can be alternatively implemented so that the selected data bit is a last data bit D6 in a previous series of data bits that was just transmitted.

It should be noted that the embodiment of the signal generation unit 200 is provided as an example for a certain communication protocol. For example, for a communication protocol in which different devices or different sources may transmit in different time slots. In this case, the device that is controlling the timing information, such as a framer, a master device or a controller as discussed with respect to FIG. 6, is the only device that provides the data bit D0 which is sent along with an inverted version of D0 in the first two time slots by the signal generation unit 200. During the other time slots, other devices, sources or different channels from one device may provide a data bit for transmission in which case all of the other devices, sources or different channels may tri-state or disable the output in other ways (e.g. using open-drain or open collector driving) to avoid a bus conflict from happening.

In an alternative embodiment, an electronic device that communicates according to a communication protocol may comprise an interface for sending and receiving signals; and a data transceiver coupled to the interface, the data transceiver being configured to determine time slots for sent and received data bits according to an increased bandwidth encoding scheme that uses bit inversion with at least a selected bit and an inverted version of the selected bit being positioned consecutively in a series of data bits to convey an edge of a clock signal along and positioning each bit in a single unique time slot.

In an aspect of this embodiment, the bit inversion comprises replicating a first bit in the series of data bits, inverting either the replicated data bit or the first bit and transmitting the replicated data bit before the series of data bits.

In another aspect of this embodiment, the data transceiver may comprise a phase locked loop (PLL), a delay line and an XOR gate coupled to one another and configured to retrieve the clock signal.

The data transceiver generally recovers the clock information in the increased bandwidth signal in order to be able to receive the data bits correctly and possibly also transfer information back to the device that sent out the timing information during the first two timeslots (where bit inversion is used to signify a clock edge). This can be done using an edge type PLL or a Delayed Lock Loop (DLL). In order to utilize all transitions due to bit inversion, the PLL or DLL should preferably use both data edges for synchronization. This may be done by delaying the increased bandwidth signal slightly and multiplying or performing the logical XOR function with the non-delayed signal. This will result in a positive output whenever there is a transition in logic level regardless of the direction. Furthermore, if a transition in logic level is expected but does not occur, the PLL may be able to search for the next possible position in order to detect the period for the clock edges in the increased bandwidth signal. In some embodiments, the clock recovery circuit may perform a cycle skipping (e.g. increase an internal delay) whenever a transition is expected but does not happen. After some time the circuit will get in lock with the correct start of data and here there will be a transition at every start of a group of bits.

Figure 9A:
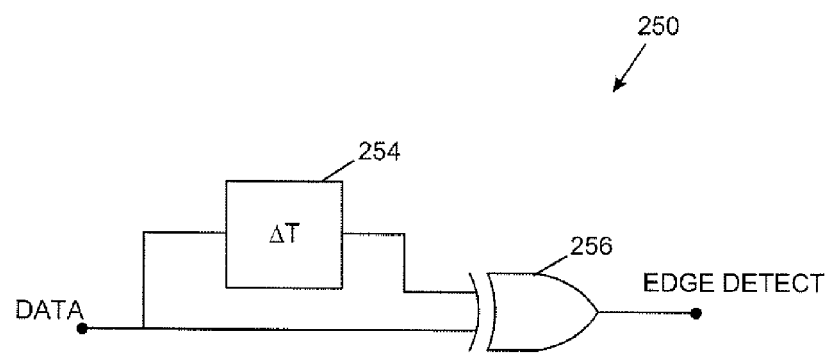
FIG. 9a is a block diagram of an example embodiment of a clock edge detector for detecting a clock edge in an increased bandwidth signal in accordance with the teachings herein.

Referring now to FIG. 9a, shown therein is a block diagram of an example embodiment of a clock edge detector 250 for detecting a clock edge in an increased bandwidth signal in accordance with the teachings herein. The clock edge detector 250 has a detector input, a delay unit 254, an XOR gate 256 and a detector output. It should be understood that there may be other embodiments in which the clock edge detector has different components or a different configuration depending on how the increased bandwidth signal is structured and possibly also depending on the communication protocol that is used.

The detector input receives a series of data bits (labeled DATA) which is an increased bandwidth data signal in accordance with the teachings herein. The clock edge detector 250 processes the series of data bits to detect the edge of a clock transition in the series of data bits. The detector output provides an indication of edge detection in the output signal labeled EDGE DETECT.

Figure 9B:
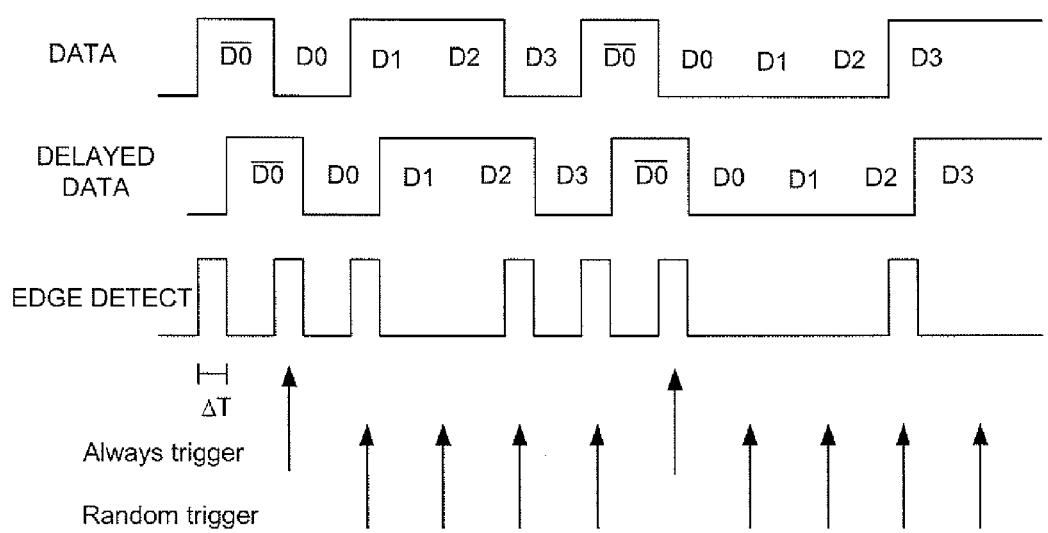

The delay unit 254 is coupled to the detector input to receive the increased bandwidth signal and generate a delayed version of the increased bandwidth signal labeled as DELAYED DATA in FIG. 9b.

The XOR gate 256 is coupled to the delay unit 254 and the detector output to perform a logical XOR function on the increased bandwidth signal and a delayed inverted version of the increased bandwidth signal to produce an edge detection signal at an output of the XOR gate 256. The detector output is coupled to the output of the XOR gate 256 for providing the edge detection signal EDGE DETECT.

Referring now to FIG. 9b, shown therein is a block diagram of an example embodiment of an increased bandwidth signal DATA, a delayed version of the increased bandwidth signal DATA DELAYED and a resulting edge detection signal EDGE DETECT generated by the clock edge detector 250. In this example, the first series of data bits (i.e. the first group of symbols) D0-D3 is {0, 1, 1, 0} is followed by a second group of symbols D4-D7 which is {0, 0, 0, 1}. For simplicity it is assumed the bits are transmitted as a high level for one and a low level for a zero (i.e. not NRZI encoded). The first data bit D0 is selected for inversion and the inverted bit was transmitted first in the series of data bits. As can be seen in the EDGE DETECT signal, the true clock edges are indicated by the arrows in the row titled "Always trigger". The other pulses in the EDGE DETECT signal are random pulses indicated by the arrows in the row titled "Random trigger". Since the clock edges due to bit inversion are consistent and the other edges in the EDGE DETECT signal are random, the consistent edges due to bit inversion can be used for synchronization. The synchronization mechanism may skip through the sequence by a delay equal to one time slot or less whenever a transition has not been found at the assumed position of synchronization. This way, the detector may quickly go through all positions until the start of a group is found at $\overline{D0}$ and D0.

Figure 10A:
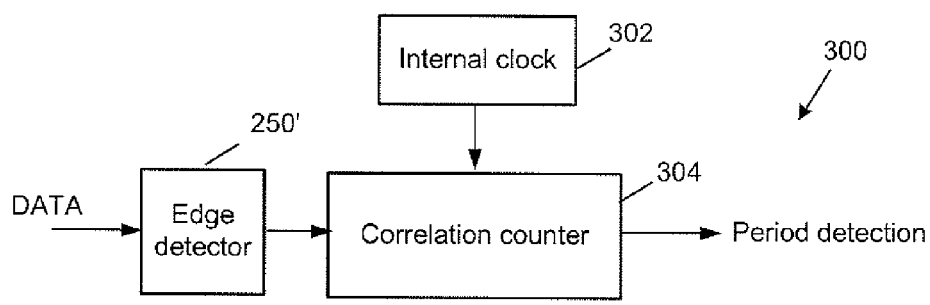
FIG. 10a is a block diagram of an example embodiment of a period detection unit for detecting a clock period in an increased bandwidth signal in accordance with the teachings herein.

In an alternative embodiment, the clock edge detector may be alternatively be implemented to employ autocorrelation. Referring now to FIG. 10a, shown therein is a block diagram of an example embodiment of a period detection unit 300 configured to recover a clock signal and determine a period for an increased bandwidth signal in accordance with the teachings herein. The detected period can be used to synchronize devices to the particular configuration being used for an increased bandwidth signal.

The period detection unit 300 comprises an edge detector 250' that is configured to receive the increased bandwidth signal (labeled as DATA) and send the detected edges to a correlation counter 304 that also receives a second clock signal from an internal clock 302. In other embodiments, the second clock signal may be provided by an external clock. The period detection unit 300 is configured to determine a maximum value of the autocorrelation function of the increased bandwidth signal as this indicates the period of the increased bandwidth signal. The correlation counter 304 may include IIR filters for each correlation channel in order to filter out spurious spikes from the autocorrelation process to give a well filtered and smooth output.

Figure 10B:
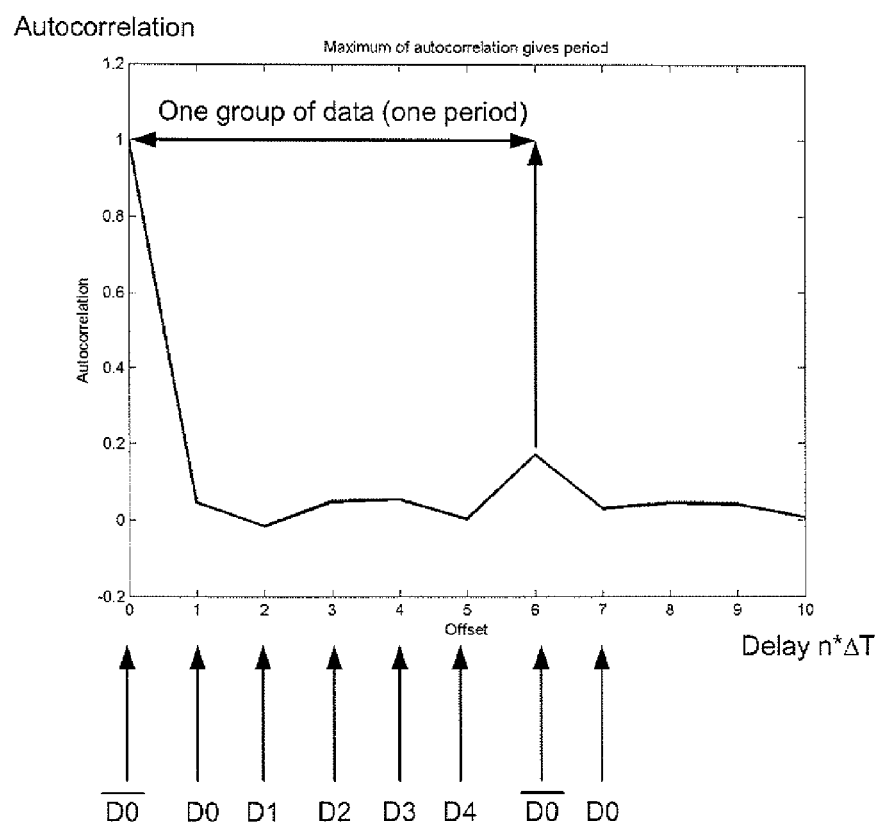
FIG. 10b shows an example of an autocorrelation function for the period detection unit of FIG. 10a based on an increased bandwidth signal having the general sequence $\overline{D0}$, D0, D1, D2, D3 and D4.

Referring now to FIG. 10b, shown therein is an example of an autocorrelation function for the period detection unit 300 based on an increased bandwidth signal having the general sequence: $\overline{D0}$, D0, D1, D2, D3 and D4. The bit D0 is the first data bit in a series of data bits or group of data. One period of the increased bandwidth signal is from the time slot where the inverted bit $\overline{D0}$ is transmitted to the time slot when the last data bit D4 is transmitted. As is shown, the autocorrelation has a maximum value at the time slot when the inverted first data bit is transmitted, i.e. when there is a delay of zero between the internally assumed start position and the real start position. The second maximum of the sequence indicates the length of a group of symbols. By knowing the length of a sequence of symbols synchronization may be obtained, since it is now known in what time window the transition should happen in order to be a valid start. In FIG. 10b, the first maximum after the initial maximum located at zero delay is found to be after a six sample delay, i.e. each group repeats after six samples. A PLL or DLL or similar circuit should then use this information (group size is six samples) to determine the distance between each start of a group. If there are no changes within a certain group position, it is not the correct one and one should skip to the next position.

Figure 11:
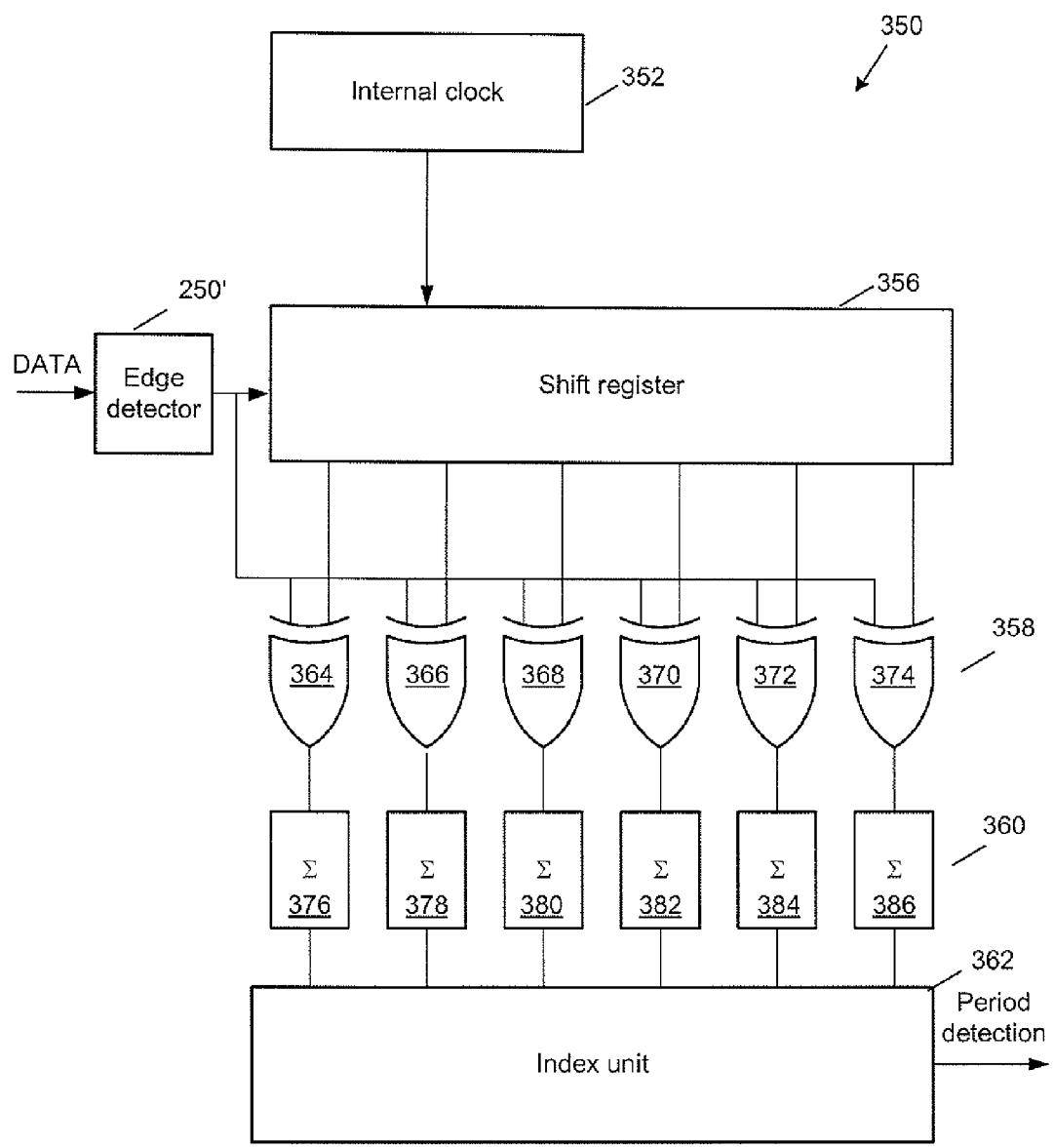
FIG. 11 is a block diagram of an example embodiment of a correlation counter for detecting a clock period in an increased bandwidth signal in accordance with the teachings herein.

Referring now to FIG. 11, shown therein is a block diagram of another example embodiment of a correlation counter 350 for detecting a clock period in an increased bandwidth signal in accordance with the teachings herein. The detected period can be used to synchronize devices to the particular configuration being used for an increased bandwidth signal.

The correlation counter 350 comprises an input terminal, an internal clock 352, an edge detector 250', a shift register 356, a plurality of XOR gates 358, a plurality of accumulators 360, an index unit 362 and an output terminal. The input terminal receives the increased bandwidth signal (labeled DATA) and the output terminal provides the period of the increased bandwidth signal (labeled Period detection). In some alternative embodiments, the edge detector 250' and the internal clock 352 may not be part of the correlation counter 350.

The input terminal receives the increased bandwidth signal and provides this signal to the edge detector 250'. The edge detector 250' may operate as discussed previously for edge detector 250 in order to generate the EDGE DETECT signal. In some cases, an alternative design may be used for the edge detector 250' as compared to the edge detector 250.

The shift register 356 is coupled to the edge detector 250 to delay the EDGE DETECT signal a number of times and provide a plurality of shifted EDGE DETECT signals at the outputs of the shift register 356. The plurality of shifted EDGE DETECT signals may be used to find the period of the repetition of the transitions in the increased bandwidth signal.

Each XOR gate 364 to 374 of the plurality of XOR gates is coupled to the outputs of the edge detector 250 and the shift register 356 to respectively receive the EDGE DETECT signal and a unique shifted EDGE DETECT signal from the plurality of shifted EDGE DETECT signals as inputs. In this example embodiment there are 6 bits in the series of data bits meaning $\overline{D0}$, D0, D1, D2, D3, D4, which is consistent with the example shown in FIG. 10b. The XOR gates 364 to 374 are configured to apply an XOR logical function to their inputs. The outputs of the XOR gates 364 to 374 are provided to the plurality of accumulators 360.

Each accumulator 376 to 386 of the plurality of accumulators 360 is coupled to the output of a unique XOR gate 364 to 374 of the plurality of XOR gates 360 and configured to accumulate an output of the unique XOR gate for a given amount of bits from the DATA signal. Due to the random nature of the received data, it may take some time to distinguish between random data and the synchronization event. The accumulation of data may require several hundred of even a few thousand events to reliably distinguish between random data and the synchronization event, i.e. the accumulators may be 10-16 bits long for a relatively short group size (2-8 bits). If the group length is longer than the synchronization time will increase approximately by the square root of M, where M is the number of elements in each group. This means that the word length would increase by LOG 2(square root(M)). The output of each accumulator 376 to 386 of the plurality of accumulators 360 is coupled to the index unit 362. The outputs of the plurality of accumulators 358 can be illustrated as a histogram, an example of which is shown in FIG. 10b.

The index unit 362 is coupled to the plurality of accumulators 360 and is configured to determine an index value that corresponds to a given accumulator of the plurality of accumulators 360 that provides a maximum value as this indicates the period of the increased bandwidth signal DATA (as explained previously in relation to FIG. 10b). The index is provided as the Period detection output signal. A delay equal to zero is not included in the calculation, since this first maximum will not indicate the period, but merely show the correlation of the signal with itself.

The period of the increased bandwidth signal DATA can be used to adjust internal timing to the DATA signal thereby recovering the clock information and period of the DATA signal. If the timing and length of each group of symbols (bits) is well known, it may not be necessary to include a circuit that finds the length of each group of symbols. In this case, the autocorrelation circuit may be omitted and the output from the edge detector may be used directly to control a PLL together with other circuits that closely represent the known timing of the bus. This alternate solution may require the number of symbols sent per group to be fixed and/or the frequency of operation to be fixed or within a narrow range.

It should be noted that in alternative embodiments, the number of shifts provided by the shift register, the number of the plurality of XOR gates 358 and the number of accumulators 360 can be increased relative to an expected period for the increased bandwidth signal in order to determine the period of the clock edges in the increased bandwidth signal with more accuracy.

In an alternative embodiment, a known length may be used for each series of data bits in an increased bandwidth signal so that the clock period remains steady during operation and can be used by the various devices communicating with one another without having to use a more complex design, such as that shown in FIG. 10a or FIG. 11, for the receiver or transceiver at the devices to determine the period.

It should be noted that the increased bandwidth encoding scheme can be integrated with a variety of different communication protocols such as, but not limited to, S/PDIF, TOSLINK, near field magnetic links, sensor bus systems and the IEEE standard 802.3, for example.

It should also be noted that the increased bandwidth encoding scheme described herein can be used with a plurality of data formats such as binary words, digital word data, bitstream data, as well as string and floating point data, encrypted data, compressed data or special encoded data such as multilevel PDM streams or other data types depending on the particular communication protocol that is used (e.g. WiFi, SPDIF, TOSLINK, Bluetooth, $I^2S$, $I^2C$, McBSP, McPDM, PDM, etc.) or the system that the increased bandwidth encoding is used in.

For example, in the case of bitstream data, data may be sent to or received from different ports of a device or from different devices that may be grouped together in a variety of different ways, such as by using the communication protocol described in U.S. patent application Ser. No. 13/784,457, for example. The encoding schemes described herein may then be used for support of various applications such as, but not limited to, digital headsets and HDTV audio applications, for example. Alternatively, the encoding schemes described herein may then be used to enable more audio channels, more control channels or the use of a lower clock frequency when transmitting frames of data thereby increasing the functionality of the communication protocol. An example illustrating this versatility with the increased bandwidth encoding scheme will now be discussed with respect to FIGS. 12a and 12b.

The communication protocol described in U.S. patent application Ser. No. 13/784,457 will now be described for better understanding of FIGS. 12a and 12b. This communication protocol is described as a unified bus communication protocol which generally is understood to provide a unified interface that can handle bitstream data, digital word data and control data while using a smaller number of wires or communication channels, such as a single wire bus or a single communication channel, and therefore a smaller number of terminals. Furthermore, it should be understood that, as used herein, the term unified bus communication protocol means that the unified bus communication protocol has been extended to include the use of one of the increased bandwidth encoding schemes described herein.

The term numeric data is meant to include audio data or measurement data such as current, voltage, pressure, temperature and the like. The numeric data can be initially produced by a device in a bitstream format or a digital word format. In some embodiments, multi-level PDM data may be transmitted in the same way that PCM data are transferred. Digital words are meant to cover binary coded words, and floating point words (i.e. unsigned or two's complement word).

The unified bus communication protocol can transfer both PDM and PCM data at the same time by multiplexing data streams from different transmitters. When transmitting bitstream data information is transferred one bit at a time and may be multiplexed from different data channels instead of transferring all the data from each data channel one data channel at a time. It is possible to transfer PCM words in bitstream mode. The PCM words may be transferred in a single column (i.e. a single frame channel), as if the other columns (i.e. frame channels) did not exist or multiplexed directly with PDM data in one or more frame channels.

The term data channel generally refers to a channel that generates or receives data in a certain format. Accordingly, a word data channel is a channel that operates on digital word data and a bitstream data channel is a channel that operates on bitstream data.

The term frame channel is used to define channels of data in a bitstream frame or a unified bitstream frame in which the frame channels are multiplexed and are given certain time slots in a frame.

In a unified frame format, there is at least one virtual frame channel in which digital word data for at least one word data channel are transmitted one bit at a time. In the unified frame format, there may also be at least one bitstream frame channel which receives bitstream data from one or more bitstream data channels. The bitstream frame format and the unified frame format generally include a bitstream of command words in a control channel.

Bitstream data may be generated as the output of oversampled systems such as, but not limited to, delta-sigma converters, for example. The oversample rate is used to indicate the ratio between a sampling clock and the final output sample rate after decimation (or vice-versa for interpolation). Bitstreams are used to transfer data in telecommunication and audio applications and as a storage format (e.g. on super audio CDs, SACD).

A digital word is a sequence of 0's and 1's having a certain resolution that is used to represent an analog value in a digital format. For example, a 16-bit digital word has 16 bits where each bit can be a 0 or a 1. The digital word can be produced using a method called Pulse Code Modulation (PCM) in which case the digital words are referred to as PCM words or audio words (for audio applications). PCM words are used for digital audio in a variety of devices including CDs, Blu-ray players, DVD players, computers, smart phones, laptops, tablets and the like.

At the various devices that use word data channels, the digital word data may be multiplexed with bitstream (e.g. PDM, pulse density modulated) data for transmission on the bus 64 or demultiplexed from the unified bitstream version into word data where it is used by the device. As an example, a system could contain two digital amplifiers that receive bitstream data and a connection to a Bluetooth or digital FM receiver or transmitter. The first slave devices (i.e. the amplifiers) may use bitstream data or multiplexed PCM data while the other devices may use multiplexed PCM data.

Digital word data may be multiplexed with bitstream data by using one or more channels that are allocated as virtual frame channels. In the virtual frame channels, digital word data is multiplexed (i.e. interleaved or interlaced) one bit at a time along with bitstream data while maintaining the proper order of data for the data channels. There can also be embodiments of the unified bus communication protocol in which there are programmable combinations between channels that use bitstream data and channels that use digital word data which allows for at least one of bandwidth control and combining data that is sampled at different sampling rates depending on the particular embodiment. A control channel may also be allocated so that control data can be multiplexed or interlaced one bit at a time along with other types of data.

The data that is communicated using the unified bus communication protocol generally includes synchronization data, control data, numeric data, and clock information. The synchronization data includes S words while the control data includes X command words and Y command words. A frame format generally includes the transmission of an S word, a X word and a Y word. After these commands have been transmitted, there may be space allocated for data transmission depending on the particular use scenario.

The transmission of an S word by the master device 52 allows the slave devices that are physically connected to the bus 64 to be locked on (i.e. synchronized) for communication with the master device 52 (the method to synchronize is described in more detail in U.S. patent application Ser. No. 13/784,457). Transmission of the S word also allows the master device 52 to determine if any interrupts have been set that require attention.

Between the transmission of the S word and an X word, random data or information may be transmitted over the bus 64 which can be picked up by at least one of the slave devices 54 or the master device 52. This information includes, but is not limited to, bitstreams, audio data or other numeric data such as, but not limited to, sensor data for example.

Transmission of an X word allows the master device 52 and the slave device 54 to determine if any specific function or operation is to be executed or to determine the status of at least some of the slave devices 54 or to specify a portion of an address for an operation. Examples of operations within a frame include a PING, READ, WRITE or FUNCTION operation and may be determined by the using certain bits of the X word that identify the operation and may provide information to be used by the particular operation. The READ, WRITE and FUNCTION operations may be used to send out or receive information to one specific device attached to the bus 64. The FUNCTION operation can be used for a variety of purposes. For example, the FUNCTION operation may be used to set a slave device 54 to operate in a certain state, to request information about a specific device or for testing purposes. In some embodiments, the same functionality may be accomplished using register reads or writes.

After transmission of the X word (assuming that there were no interrupts set), further data, as described previously, may be transmitted over the bus 64. A Y word is then transmitted which provides further address information or data information for the operation or status information for at least some of the slave devices depending on the operation. The structure of the Y word will also depend on what operation is currently under way. In general, the Y word is used to communicate data and possibly address information between the master device 52 and one or more slave devices 54.

Figure 12A:
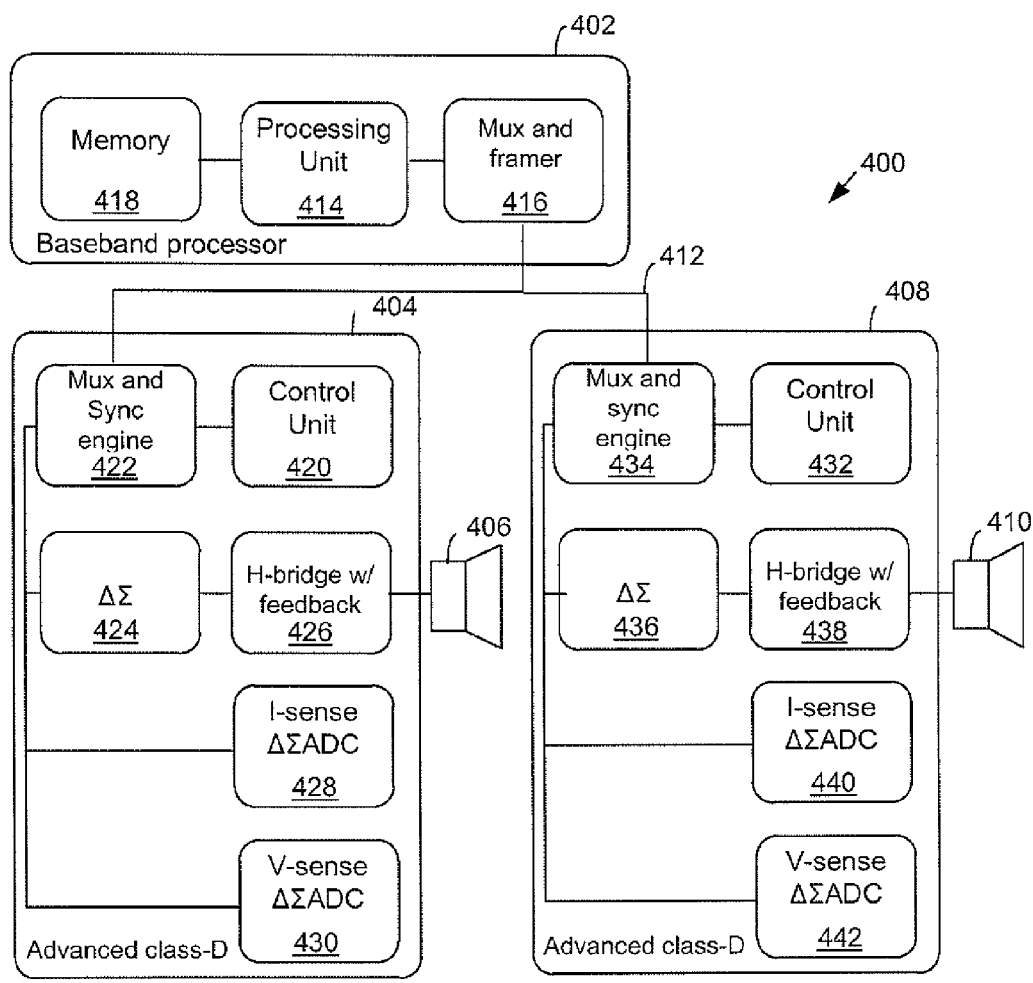
FIG. 12a shows an example embodiment of a stereo system with current and voltage sensing that can use an increased bandwidth signal along with multi-channel data transmission in accordance with the teachings herein for communication.

Referring now to FIG. 12a, shown therein is an example embodiment of a stereo system 400 with current (I) and voltage sensing (V) that can use an increased bandwidth signal along with multi-channel data transmission in accordance with the teachings herein when using a communication protocol such as the unified communication protocol. The stereo system 400 comprises a baseband processor 402, a first amplification unit 404 with a first speaker 406, a second amplification unit 408 with a second speaker 410 and a bus 412. The first amplification unit 404 and the speaker 406 can be considered to be a left audio channel for the stereo system 400 while the second amplification unit 408 and the speaker 410 can be considered to be a right audio channel for the stereo system 400. The bus 412 couples the baseband processor 402 with the first and second amplifier units 404 and 408.

The baseband processor 402 comprises a processing unit 414, a mux and framer (which provides clock and synchronization information) 416 and a memory 418. The processing unit 414 can be a processor, such as a DSP, or a dedicated hardware circuit. The mux and framer 416 is configured so that the baseband processor 402 acts as a master device so that it can communicate with and control the operation of the first and second amplification units 404 and 408 over the bus 412 in accordance with the unified bus communication protocol in combination with the increased bandwidth encoding scheme.

The first amplification unit 404 comprises a control unit 420, a mux and sync engine 422, and a delta sigma converter 424, an amplifier 426, a current sensor 428 and a voltage sensor 430. The mux and sync engine 422 is configured so that the first amplification unit 404 acts as a slave device and can communicate with the baseband processor 402 over the bus 412 in accordance with the unified bus communication protocol. The control unit 420 can be implemented by a processor or dedicated hardware and firmware that control the operation of the first amplification unit 404. In operation, audio data is transmitted from the baseband processor 402 to the first amplification unit 404 for amplification. The audio data is converted to an analog format via the converter 424, amplified by the amplifier 426 and output by the speaker 406. Current and voltage information related to the operation of the amplification unit 404 is measured by the current sensor 428 and the voltage sensor 430, respectively, and transmitted to the baseband processor 402 for monitoring the operating condition of the amplification unit 404. If the monitoring indicates that the amplification unit 404 is in a dangerous state, such as overheating, overcurrent or undervoltage, the baseband processor 402 can send control instructions to the amplification unit 404 to deal with the dangerous situation, as is understood by those skilled in the art.

The second amplification unit 408 comprises a control unit 432, a mux and sync engine 434, a delta sigma converter 436, an amplifier 438, a current sensor 440 and a voltage sensor 442. The mux and sync engine 434 is configured so that the second amplification unit 408 acts as a slave device and can communicate with the baseband processor 402 over the bus 412 in accordance with the unified bus communication protocol. The control unit 432 can be implemented in a similar fashion as the control unit 420. In operation, the second amplification unit 408 operates in a similar fashion as the first audio amplification unit 404.

The mux and framer 416 and the mux and sync engines 422 and 434 may be used to generate data and place the data in certain time slots on the bus 412 according to the frame format of the unified bus communication protocol that is being used. The mux and framer 416 and the mux and sync engines 422 and 434 may also be used to generate synchronization information (S words) for the unified bus communication protocol.

In general, a mux and framer as well as a mux and sync engine can be implemented using a processor. However, since there is approximately a 2K gate count for a mux and framer or a mux and sync engine, a state machine or other dedicated circuitry may also be used for implementation. For example, in a typical 0.18 µm process, a mux and framer for a master device may be implemented in 0.04 mm$^2$. A complete master device with full audio support may be somewhat larger, but may be less than 0.1 mm$^2$. Mux and sync engines for slave devices can be of a similar size in both cases. In an alternative embodiment, the baseband processor 402 can be implemented using a main processor for an electronic device that contains the baseband processor 402 or a baseband processor for a cell phone or a smart phone may be used in those cases.

It should be noted that the mux and framer 416 and the mux and sync engines 422 and 434 can be implemented as hardware blocks. Furthermore, in an alternative embodiment, at least one of the processing unit 414 and the control units 420 and 432 may be integrated with the corresponding elements 416, 422 and 434, respectively.

In the example system 400 of FIG. 12*a*, bandwidth use can be improved by multiplexing data in various ways. This concept can be used for other types of applications other than audio applications in which there are differences in bandwidth of the various data similar to this current example. Multiplexing data can be accomplished by sharing a channel among multiple transmitters which results in a reduction in bandwidth use for each transmitter. The multiplexing between the transmitters or channels can be implemented by using several counters and buffers.

This concept of bandwidth control can also be extended to control the bandwidth of a control channel by using more than one channel for one transmitter. In other words, by sending out data from a transmitter more than once in the horizontal direction of a bitstream frame format, the bandwidth allocated to the control frame channel can be reduced and therefore the bandwidth that is used for the transmission of control words is smaller. An example of this is shown in FIG. 12*b* in which the control frame channel (i.e. the last column) is now 1 out of 6 bitstream frame channels for a bandwidth of ⅙=16.7% as compared to an example embodiment in which the control frame channel is 1 out of 4 bitstream frame channels for a control bandwidth of ¼=25%.

Referring now to FIG. 12*b*, shown therein is an example of a portion of a frame format that can be used for the unified communication protocol with increased bandwidth encoding for the system 400. Although the data in FIG. 12*b* is shown starting with S0 of the S synchronization word, it could have started with S15 which is at the start of a frame of data. For every series of data bits, in accordance with the increased bandwidth encoding scheme described herein, two time slots are used to transmit clock information combined with data and one time slot is used to transfer any subsequent data bit.

The frame format shown in FIG. 12*b* comprises six columns and each amplifier 404 and 408 in the system 400 has a port that receives a binary bitstream and a port with two channels, each transmitting bitstream data (I and V information) at a lower sample rate. The amplification unit 404 provides a first port for a left audio channel (L) and a second port for IV-sense (IL, VL). The amplification unit 408 provides a first port for a right audio channel (R) and a second port for IV-sense (IR, VR).

In the frame format of FIG. 12*b*, the last column is the control channel that includes bits of the S word, X word and Y word and possibly some audio data in the same column following the control bits. The first and fourth columns are isochronous bitstream frame channels having data for the left audio channel. The second and fifth columns are isochronous bitstream frame channels having data for the right audio channel. The first column is a multiplexed isochronous channel providing four different types of data.

It can be seen, that by varying how data bits from the various ports of the amplification units 404 and 408 are transmitted, the proportion of bandwidth that is allocated to isochronous bitstream frame channels can be varied as compared to the proportion of bandwidth that is allocated to the control channel. For example, if a channel is repeated often in the horizontal direction (such as for the left and right audio channels) then more bandwidth is allocated to the isochronous channel as compared to the control channel. Depending on the spaces vertically in a multiplexed channel (such as the fourth column in the frame format of FIG. 12*b*) more or less bandwidth may be allocated to an isochronous channel as compared to the control channel.

Accordingly, by performing at least one of combining data from different bitstream data channels into a common frame channel and by repeating the allocation of bitstream data channels to different frame channels, the bandwidth of the various data channels and the control frame channel can be varied depending on the specific application for more efficient bandwidth use and therefore more efficient data transmission.

Accordingly, the increased bandwidth encoding schemes taught herein may be used to implement a multichannel high speed audio interface.

Furthermore, in an example embodiment, it is possible to simplify the synchronization of data, because the start of each row may be indicated by the physical layer and the clock recovery circuit. This may be used to indicate the start of each row and the number of columns in each row. In some instances, the clock recovery circuit may merely indicate the start of each time slot and not the start of each row for simplicity; in this case the internal synchronization engine may not be simpler but the clock recovery circuit may be simpler. If it is required to get a response in the column allocated to control, it is not in the same column that carries the clock information, since this is sent from the master device to the slave devices. A convenient place to place the bi-directional command information may be in the second or last column of a frame, though any column except the column containing clock information may be used. Therefore, the column transferring clock and data information may normally contain audio or other information that is transmitted from the master device to the slave devices.

In an alternative embodiment, it may be possible to use a multi-level voltage scheme with one of the increased bandwidth encoding schemes described herein to send out even more data in a given time frame. For example, four voltage levels can be used instead of two voltage levels to send two data bits per time slot. This allows for higher bandwidth since more data is being sent out in a given time period. The multi-voltage level data scheme also allows for lower power consumption since a lower clock rate can be used to send out the same amount of data. However, a multi-voltage level data scheme is more sensitive to ElectroMagnetic Interference (EMI) than a two voltage level data scheme.

For example, assuming there is a 1.8 Volt power supply, in the two voltage level data scheme, voltages of 0 V and 1.8 V can be used to transmit data, which means that there is a 0.9 V noise margin. With a four voltage level data scheme, voltages of 0 V, 0.6 V, 1.2V and 1.8V can be used for the different voltage levels, which means that there is a noise margin of 0.3 V. In the four voltage level case, 0 V can represent '00', 0.6 V can represent '01', 1.2 V can represent "10" and 1.8 V can represent '11'. It should be noted that when multilevel signaling is used, there is the minor limitation in that only a single device can determine more than one bit. Therefore, for any slots, where more than one device may want to write to (e.g. acknowledge or interrupt bits) this time slot would need to use only two voltage levels and not multilevel signaling.

It should be understood that with the increased bandwidth encoding schemes described herein it may be possible to freely multiplex between two or more transmitters within each group of symbols or each series of data bits. This means that data can be freely sent from multiple microphones or different devices and the data can be multiplexed together, which reduces latency. Any unused time slots in which a data bit is not used may be tri-stated. Furthermore, if ones (or zeros) are signaled using a change of logic state and the other value, zeros (or ones), is signaled using no change of logic state, then it may be possible to have multiple transmitter signals in the same time slot (e.g. for interrupt requests, IRQ).

Furthermore, with the increased bandwidth encoding schemes described herein, data bits can either be transferred using a wire or using a wireless medium, such as, but not limited to, a magnetic coupled link or using electromagnetic waves such as high frequency wireless transmission. Accordingly, the increased bandwidth encoding schemes can be used with a digital key that has two terminals (i.e. two metal conductors) or using RF-ID wireless communications.

Furthermore, when using the increased bandwidth encoding scheme along with a wire to conduct the information, the information may be transferred using direct logical signaling (totem pole or complementary outputs) or using topologies that allow multiple devices to signal simultaneously such as, but not limited to, open drain, open collector signaling or dynamic signaling types such as NRZI signaling combined with a bus holder or utilizing the bus capacitance.

In one broad aspect, in at least one embodiment described herein, there is provided herein an electronic device comprising: a controller to control the electronic device; an interface coupled to the controller, the interface being configured to send and receive signals; and a signal generation unit coupled to the controller and the interface, the signal generation unit being configured to select a data bit, generate an inverted version of the selected data bit and position the inverted version of the selected data bit in a consecutive fashion with respect to the selected data bit to signify an edge of a clock signal with the selected data bit, the inverted version of the selected data bit and subsequent data bits each being transmitted or received in a single unique time slot thereby providing an increased bandwidth signal with clock information for a series of data bits being transmitted or received.

The inverted version of the selected data bit may precede the non-inverted version of the selected data bit.

Alternatively, the non-inverted version of the selected data bit may precede the inverted version of the selected data bit.

The selected data bit may be a first data bit in a current series of data bits being currently transmitted.

Alternatively, the selected data bit may be a last data bit in a current series of data bits being currently transmitted.

In another alternative, the selected data bit may be a last data bit in a previous series of data bits that was just transmitted.

The signal generation unit may comprise a register to receive a series of data bits and a clock input signal; an inverter coupled to the register and configured to receive the selected data bit and generate the inverted version of the selected data bit; a multiplexer coupled to the register and the inverter, the multiplexer being configured to receive the series of data bits and the inverted version of the selected data bit with the inverted version of the selected data bit being received at a first input of the multiplexer adjacent to a second input of the multiplexer that receives the inverted version of the selected data bit; and a counter coupled to the multiplexer and to the clock input signal, the counter being configured to provide a count input to the multiplexer to cause the multiplexer to transmit the series of data bits and the inverted version of the selected data bit with each bit being sent in a unique time slot to produce the increased bandwidth signal, the timing of the time slots being determined by the clock input signal.

The device may further comprise an output stage configured to receive multiplexed data from an output of the multiplexer and the clock input signal, the output stage being configured to send the multiplexed data to the interface in the time slots according to the clock input signal.

The device may further comprise a clock edge detector configured to receive the increased bandwidth signal and detect transitions related to clock information in the increased bandwidth signal, the clock edge detector comprising a detector input to receive the increased bandwidth signal; a delay unit coupled to the detector input to receive the increased bandwidth signal and generate a delayed version of the increased bandwidth signal; an XOR gate coupled to the delay unit and the detector output to perform a logical XOR function on the increased bandwidth signal and a delayed version of the increased bandwidth signal to produce an edge detect signal at an output of the XOR gate; and a detector output coupled to the output of the XOR gate to provide the edge detect signal.

The device may further comprise a Phase locked loop 'PLL' or a Delay Locked Loop 'DLL' coupled to the detector output in order to determine a period and to get in lock with the increased bandwidth signal.

The device may further comprise a clock edge detector configured to receive the increased bandwidth signal, detect transitions in the increased bandwidth signal related to clock information and output the detected transitions in an edge detect signal; and a period detection unit coupled to the clock edge detector and configured to recover a clock signal and determine a period for the increased bandwidth signal, the period detection unit comprising a correlation counter configured to receive the edge detect signal and a second clock signal and to determine a maximum value of an autocorrelation of the edge detect signal, the maximum value indicating the period of the clock information in the increased bandwidth signal.

The correlation counter may comprise an input terminal to receive the edge detect signal; a shift register coupled to the input terminal to receive the edge detect signal and configured to provide a plurality of shifted edge detect signals; a plurality of XOR gates, each XOR gate of the plurality of XOR gates being coupled to the input terminal and the shift register to receive the edge detect signal and a unique shifted edge detect signal from the plurality of shifted edge detect signals as inputs and being configured to apply a logical XOR function to the inputs; a plurality of accumulators, each accumulator of the plurality of accumulators being coupled to a unique XOR gate of the plurality of XOR gates and configured to accumulate an output of the unique XOR gate; an index unit coupled to the plurality of accumulators and being configured to determine an index value corresponding to a given accumulator of the plurality of accumulators that provides a maximum value; and an output terminal coupled to the index unit for providing the index value as a period detection signal.

The device may further comprise a Phase Locked Loop 'PLL' or a Delayed Locked Loop 'DLL' that processes the period detection signal to setup a short window of interest to lock onto the edge detect signal.

The series of data bits that may be transmitted or received may comprise one of binary words, digital word data, bitstream data, PDM data, PCM data, string and floating point data, encrypted data, compressed data, compressed audio, control data and encoded data.

In another broad aspect, in at least one embodiment described herein, there is provided herein an electronic device that communicates according to a communication protocol, wherein the device comprises an interface to send and receive a signal; and a data transceiver coupled to the interface, the data transceiver being configured to transmit or receive during time slots according to an increased bandwidth encoding scheme that uses bit inversion with at least a selected bit and an inverted version of the selected bit being positioned consecutively in unique time slots to convey an edge of a clock signal and subsequent data bits being positioned in a single unique time slots thereafter.

The bit inversion may comprise replicating a first data bit, inverting either the replicated data bit or the first bit and transmitting the replicated data bit before or after the first data bit and then transmitting or receiving one or more of the subsequent data bits.

The data transceiver may comprise a phase locked loop, a delay line and an XOR gate coupled to one another and configured to retrieve the clock signal.

In another broad aspect, in at least one embodiment described herein, there is provided a method for generating data for communication between devices, wherein the method comprises determining time slots for sent and received data bits according to an increased bandwidth encoding scheme; selecting a data bit at a beginning of a current transmission period or at an end of a previous transmission period; generating an inverted version of the selected data bit; positioning the inverted version of the selected data bit and the selected data bit in two consecutive time slots to convey an edge of a clock signal; and transmitting or receiving subsequent data bits at unique single time slots after the two time slots having the inverted version of the selected data bit and the selected data.

The method may comprise positioning the inverted version of the selected data bit in a first time slot for a current transmission period if the selected data bit is at the ending of a previous transmission period or positioning the selected data bit and the inverted version of the selected data bit consecutively in first and second time slots for the current transmission period if the selected data bit is at the beginning of the current transmission period.

In another broad aspect, in at least one embodiment described herein, there is provided herein a non-transitory computer readable medium comprising a plurality of instructions executable on a device for encoding a series of data bits to increase bandwidth, wherein the method comprises selecting a data bit; generating an inverted version of the selected data bit; positioning the inverted version of the selected data bit in a consecutive fashion with respect to the selected data bit to signify an edge of a clock signal; and transmitting or receiving the inverted version of the selected data bit and subsequent data bits in single unique time slots thereby providing an increased bandwidth signal with clock information for the series of data bits.

In another broad aspect, in at least one embodiment described herein, there is provided herein a method of encoding a series of data bits to increase bandwidth, the method comprising selecting a data bit; generating an inverted version of the selected data bit; positioning the inverted version of the selected data bit in a consecutive fashion with respect to the selected data bit to signify an edge of a clock signal; and transmitting or receiving the inverted version of the selected data bit and subsequent data bits each in single unique time slots thereby providing an increased bandwidth signal with clock information for the series of data bits.

The inverted version of the selected data bit may precede the non-inverted version of the selected data bit or the non-inverted version of the selected data bit may precede the inverted version of the selected data bit.

The selected data bit may be a first data bit in a current series of data bits being currently transmitted or the selected data bit may be a last data bit in a current series of data bits being currently transmitted or the selected data bit may be a last data bit in a previous series of data bits that was just transmitted.

The method may further comprise receiving the increased bandwidth signal; delaying the increased bandwidth signal to generate a delayed version of the increased bandwidth signal; and performing a logical XOR function on the increased bandwidth signal and the delayed version of the increased bandwidth signal to produce an edge detect signal.

The method may further comprise using a Phase locked loop 'PLL' or a Delay Locked Loop 'DLL' coupled to the detector output to determine a period and to get in lock with the increased bandwidth signal.

The method may further comprise receiving the increased bandwidth signal; detecting transitions in the increased bandwidth signal related to clock information therein; generating an edge detect signal based on the detected transitions; receiving the edge detect signal and a second clock signal; and determining a maximum value of an autocorrelation of the edge detect signal, the maximum value indicating the period of the clock information in the increased bandwidth signal.

In another broad aspect, in at least one embodiment described herein, there is provided herein a non-transitory computer readable medium comprising a plurality of instructions executable on a device for transmitting or receiving data between devices, wherein the method comprises determining time slots for sent and received data bits according to an increased bandwidth encoding scheme; selecting a data bit at a beginning of a current transmission period or at an end of a previous transmission period; generating an inverted version of the selected data bit; positioning the inverted version of the selected data bit and the selected data bit in two consecutive time slots to convey an edge of a clock signal; and transmitting or receiving subsequent data bits at unique single time slots after the two time slots having the inverted version of the selected data bit and the selected data.

In another broad aspect, in at least one embodiment described herein, there is provided herein a method of encoding bits to increase bandwidth at an electronic device. The method comprises loading a register of the electronic device with a group of bits; generating an inverted version of a first bit; transmitting or receiving the first bit and the inverted version of the first bit in first and second unique time slots to signify a clock edge, the transmitting being done if the device is configured to send clock information; transmitting or receiving a subsequent bit during a subsequent unique time slot after the second time slot depending on whether the device is configured to transmit or receive during the subsequent time slot, wherein for transmission the subsequent bit is selected from the group of bits; and repeatedly performing the transmitting or receiving of the subsequent bit until the group of bits is transmitted.

In another broad aspect, in at least one embodiment described herein, there is provided herein an electronic device comprising a controller to control the electronic device; an interface coupled to the controller, the interface being configured to send and receive at least one signal; and a transceiver coupled to the controller and the interface, the transceiver being configured to load a register of the electronic device with a group of bits; generate an inverted version of a first bit, transmit or receive the first bit and the inverted version of the first bit in first and second unique time slots to signify a clock edge, the transmitting being done if the device is configured to send clock information; transmit or receive a subsequent bit during a subsequent unique time slot after the second time slot depending on whether the device is configured to transmit or receive during the subsequent time slot, wherein for transmission the subsequent bit is selected from the group of bits; and repeatedly perform the transmitting or receiving of the subsequent bit until the group of bits is transmitted.

In these two previous aspects, the device may act as a slave device and is then configured to receive the first bit and the inverted version of the first bit.

Further, in these aspects, the device is configured to determine a period associated with the clock edge after receiving the first bit and the inverted version of the first bit a plurality of times.

In another broad aspect, in at least one embodiment described herein, there is provided herein a non-transitory computer readable medium comprising a plurality of instructions executable on a device for transmitting or receiving bits between devices with increased bandwidth. The method comprises loading a register of the electronic device with a group of bits; generating an inverted version of a first bit; transmitting or receiving the first bit and the inverted version of the first bit in first and second unique time slots to signify a clock edge, the transmitting being done if the device is configured to send clock information; transmitting or receiving a subsequent bit during a subsequent unique time slot after the second time slot depending on whether the device is configured to transmit or receive during the subsequent time slot, wherein for transmission the subsequent bit is selected from the group of bits; and repeatedly performing the transmitting or receiving of the subsequent bit until the group of bits is transmitted.

The plurality of instructions may also be defined as the previous two aspects were further defined.

It should be understood that modifications can be made to the embodiments described and illustrated herein, without departing from the embodiments, the general scope of which is defined in the appended claims.

The invention claimed is:

1. An electronic device comprising:
   a controller to control the electronic device;
   an interface coupled to the controller, the interface being configured to send and receive signals; and
   a signal generation unit coupled to the controller and the interface, the signal generation unit being configured to:
   select a first data bit from a block of N data bits for transmission in N+1 time slots,
   generate an inverted version of the selected first data bit,
   position the selected first data bit and the inverted version of the selected first data bit in a first two time slots of the N+1 time slots to create an edge signifying a start of a frame, and position the remaining N−1 data bits of the block of N data bits consecutively in the remaining N−1 time slots to generate an increased bandwidth signal with clock information, wherein N is a positive integer.

2. The device of claim 1, wherein the inverted version of the selected first data bit precedes the selected first data bit in the first two time slots.

3. The device of claim 1, wherein the signal generation unit comprises:
   a register to receive the block of N data bits and a clock input signal;
   an inverter coupled to the register and configured to receive the selected first data bit and generate the inverted version of the selected first data bit;
   a multiplexer coupled to the register and the inverter, the multiplexer comprising N+1 inputs and being configured to receive the block of N data bits and the inverted version of the selected first data bit with the inverted version of the selected first data bit being received at a first input of the multiplexer adjacent to a second input of the multiplexer that receives the selected first data bit; and
   a counter coupled to the multiplexer and to the clock input signal, the counter being configured to provide a count input to the multiplexer to cause the multiplexer to output multiplexed data, the multiplexed data comprising the block of N data bits and the inverted version of the selected first data bit with each bit being in one of the N+1 unique time slots to produce the increased bandwidth signal, a timing of the time slots being determined by the clock input signal.

4. The device of claim 3, wherein the device further comprises an output stage configured to receive the multiplexed data output from the multiplexer and the clock input signal, the output stage being configured to send the multiplexed data to the interface in the N+1 time slots determined by the clock input signal.

5. The device of claim 1, wherein the device further comprises a clock edge detector configured to receive the increased bandwidth signal and detect transitions in the increased bandwidth signal, the clock edge detector comprising:
   a detector input to receive the increased bandwidth signal;
   a delay unit coupled to the detector input to receive the increased bandwidth signal and generate a delayed version of the increased bandwidth signal;
   an XOR gate coupled to the delay unit and the detector output to perform a logical XOR function on the increased bandwidth signal and the delayed version of the increased bandwidth signal to produce an edge detect signal at an output of the XOR gate; and
   a detector output coupled to the output of the XOR gate to provide the edge detect signal.

6. The device of claim 5, wherein the device further comprises a Phase locked loop 'PLL' or a Delay Locked Loop 'DLL' coupled to the detector output in order to determine a period and to get in lock with the increased bandwidth signal.

7. The device of claim 1, wherein the device further comprises:
   a clock edge detector configured to receive the increased bandwidth signal, detect transitions in the increased bandwidth signal and output the detected transitions in an edge detect signal; and
   a period detection unit coupled to the clock edge detector and configured to recover a clock signal and determine a period for the increased bandwidth signal, the period detection unit comprising a correlation counter configured to receive the edge detect signal and a second clock signal and to determine a maximum value of an autocorrelation of the edge detect signal, the maximum value indicating the period of the edge signifying the start of the frame in the increased bandwidth signal.

8. The device of claim 7, wherein the correlation counter comprises:
 an input terminal to receive the edge detect signal;
 a shift register coupled to the input terminal to receive the edge detect signal and configured to provide a plurality of shifted edge detect signals;
 a plurality of XOR gates, each XOR gate of the plurality of XOR gates being coupled to the input terminal and the shift register to receive the edge detect signal and a unique shifted edge detect signal from the plurality of shifted edge detect signals as inputs and being configured to apply a logical XOR function to the inputs;
 a plurality of accumulators, each accumulator of the plurality of accumulators being coupled to a unique XOR gate of the plurality of XOR gates and configured to accumulate an output of the unique XOR gate;
 an index unit coupled to the plurality of accumulators and being configured to determine an index value corresponding to a given accumulator of the plurality of accumulators that provides a maximum value; and
 an output terminal coupled to the index unit for providing the index value as a period detection signal.

9. The device of claim 8, wherein the device further comprises a Phase Locked Loop 'PLL' or a Delayed Locked Loop 'DLL' that processes the period detection signal to set up a short window of interest to lock onto the edge detect signal.

10. The device of claim 1, wherein the block of N+1 data bits comprises one of binary words, digital word data, bitstream data, PDM data, PCM data, string and floating point data, encrypted data, compressed data, compressed audio, control data and encoded data.

11. A method of encoding a series of data bits to generate an increased bandwidth signal with clock information, the method comprising:
 selecting a block of N data bits from the series of data bits;
 selecting a first data bit from the block of N data bits for transmission in N+1 time slots;
 generating an inverted version of the selected first data bit;
 positioning the selected first data bit and the inverted version of the selected first data bit in a first two consecutive time slots of the N+1 time slots to create an edge signifying a start of a frame; and
 positioning the remaining N−1 data bits each in a single unique one of the remaining N−1 time slots to generate the increased bandwidth signal with clock information, wherein N is a positive integer.

12. The method of claim 11, wherein the inverted version of the selected first data bit precedes the selected first data bit.

13. The method of claim 11, wherein the selected first data bit precedes the inverted version of the selected first data bit.

14. The method of claim 11, wherein the block of N data bits is selected from a current series of data bits being currently transmitted.

15. The method of claim 11, wherein the block of N data bits includes a last data bit in a current series of data bits being currently transmitted.

16. The method of claim 11, wherein the block of data bit includes a last data bit in a previous series of data bits that was just transmitted.

17. The method of claim 11, wherein the method further comprises:
 receiving the increased bandwidth signal;
 delaying the increased bandwidth signal to generate a delayed version of the increased bandwidth signal; and
 performing a logical XOR function on the increased bandwidth signal and the delayed version of the increased bandwidth signal to produce an edge detect signal.

18. The method of claim 17, wherein the method further comprises using a Phase locked loop 'PLL' or a Delay Locked Loop 'DLL' coupled to a detector output to determine a period and to get in lock with the increased bandwidth signal.

19. The method of claim 11, wherein the method further comprises:
 receiving the increased bandwidth signal;
 detecting transitions in the increased bandwidth signal;
 generating an edge detect signal based on the detected transitions;
 receiving the edge detect signal and a second clock signal; and
 determining a maximum value of an autocorrelation of the edge detect signal, the maximum value indicating the period of the edge in the increased bandwidth signal.

20. A non-transitory computer readable medium comprising a plurality of instructions executable on a device for:
 selecting a first data bit from a block of N data bits for transmission in N+1 time slots;
 generating an inverted version of the selected first data bit;
 positioning the inverted version of the selected first data bit and the selected first data bit in a first two consecutive time slots of the N+1 time slots to create an edge signifying a start of a frame; and positioning the remaining N−1 data bits consecutively in the remaining N−1 time slots to generate an increased bandwidth signal with clock information, wherein N is a positive integer.

* * * * *